US012555646B2

(12) United States Patent
Sethuraman et al.

(10) Patent No.: US 12,555,646 B2
(45) Date of Patent: Feb. 17, 2026

(54) MODE REGISTER UPDATE (MRUPD) MODE

(71) Applicant: Intel Corporation, Santa Clara, CA (US)

(72) Inventors: Saravanan Sethuraman, Portland, OR (US); Tonia M. Rose, Wendell, NC (US)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 18/622,900

(22) Filed: Mar. 30, 2024

(65) Prior Publication Data

US 2024/0249795 A1     Jul. 25, 2024

Related U.S. Application Data

(60) Provisional application No. 63/596,257, filed on Nov. 4, 2023.

(51) Int. Cl.
*G11C 29/56* (2006.01)
(52) U.S. Cl.
CPC .. *G11C 29/56004* (2013.01); *G11C 29/56012* (2013.01); *G11C 29/56016* (2013.01)

(58) Field of Classification Search
CPC ........ G11C 29/56004; G11C 29/56012; G11C 29/56016; G11C 29/08; G11C 11/4076; G11C 5/04; G11C 29/028; G11C 29/50008
See application file for complete search history.

(56) References Cited

U.S. PATENT DOCUMENTS

2019/0206478 A1* 7/2019 Jun ....................... G11C 7/1045
2024/0249788 A1* 7/2024 Bak .................. G11C 29/50008

* cited by examiner

*Primary Examiner* — Xiaochun L Chen
(74) *Attorney, Agent, or Firm* — Compass IP Law PC

(57) ABSTRACT

A configuration register update mode can be implemented as an MRUPD (mode register update) mode for a DRAM (dynamic random access memory) device. In one example, the MRUPD can also be applied to update an RCD (registering clock driver). In the update mode, the memory device (either the RCD or the DRAM) can perform configuration of any number of configuration registers with in-band register writes. The in-band register writes can be used to configure DFE (decision feedback equalization) settings, as well as other configuration settings for non-DFE configurations of a memory device interface.

20 Claims, 13 Drawing Sheets

MRxx 510

| CSTME | CSTMX | CATME | CATMX | MRUPDE | MRUPDX | RFU | RFU |

MRxx 520

| ZQCALS | ZQCALL | 1N | 2N | DLL RESET | RFU | MECS | RFU |

FIG. 5A

TABLE 530

| PHASE | CS_n | CA0 | CA1 | CA2 | CA3 | CA4 | CA5 | CA6 |
|---|---|---|---|---|---|---|---|---|
| 0 | L | MRP0 | MRP1 | MRP2 | MRP3 | MRP4 | MRA7/V | MRA6 |
| 1 | L | MRA5 | MRA4 | MRA3 | MRA2 | MRA1 | MRA0 | OP0 |
| 2 | L | OP1 | OP2 | OP3 | OP4 | OP5 | OP6 | OP7 |

FIG. 5B

TABLE 540

| PHASE | CS_n | CA0 | CA1 | CA2 | CA3 | CA4 | CA5 | CA6 |
|---|---|---|---|---|---|---|---|---|
| 0 | L | MA0 | MA1 | MA2 | MA3 | MA4 | MA5 | V |
| 1 | L | MA6 | MA7 | OP0 | OP1 | OP2 | OP3 | V |
| 2 | L | OP4 | OP5 | OP6 | OP7 | V | V | V |

FIG. 5C

TABLE 710

702

| MRW | EDGE | /CS_n | CA0 | CA1 | CA2 | CA3 | CA4 | CA5 | CA6 |
|---|---|---|---|---|---|---|---|---|---|
| MRW-1 | R | L | H/L | H/L | H/L | H/L | TBD | MA0 | MA1 | 712
|  | F | X | MA2 | MA3 | MA4 | MA5 | MA6 | MA7 | V | 714
| MRW-2 | R | L | H/L | H/L | H/L | H/L | TBD | OP0 | OP1 | 716
|  | F | X | OP2 | OP3 | OP4 | OP5 | OP6 | OP7 | V | 718
| MRR | R | L | H/L | H/L | H/L | H/L | TBD | MA0 | MA1 | 720
|  | F | X | MA2 | MA3 | MA4 | MA5 | MA6 | MA7 | V | 722

MODE REGISTER UPDATE (MRUPD) MODE

PRIORITY

This application is a nonprovisional of, and claims the benefit of priority of, U.S. Provisional Application No. 63/596,257, filed Nov. 4, 2023.

TECHNICAL FIELD

Descriptions are generally related to computer memory, and more particular descriptions are related to memory interface training.

BACKGROUND OF THE INVENTION

A memory controller can use MRW (mode register writes) to set DRAM device configuration and perform some of the training. The memory controller traditionally needs to train the CA bus before a command such as MRW can be reliably sent to the DRAM device. Thus, programming the DRAM (dynamic random access memory) before the CA (command/address) bus and DQ (data) bus are trained has been performed by use of a sideband bus, such as the SMBus (system management bus). Sideband buses operate at a very low speed (on the order of megahertz (MHz)) relative to the CA bus and the DQ bus (on the order of gigahertz (GHz)). The use of a sideband bus for training can result in significant delays in the training.

Available DRAM devices have multiple phases of training. The training is performed with the use of MPC (multipurpose command) operation, which requires an MPC opcode table. The MPC command has access to a limited number of mode registers in the DRAM, as there is not enough flexibility in the MPC commands to access all DRAM mode registers. The training with MPC is slow and typically restricted to training the DFE (decision feedback equalization) registers. The use of the MPC operation is expected to increase, which will increase the number of MPC opcodes needed. The increase in the MPC opcodes and the training is not scalable for all possible future training.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

FIG. 5A is an example of a table for register fields for training modes available through an MRUPD mode.

FIG. 5B is a first example of a table for a MRUPD command based on seven CA pins.

FIG. 5C is a second example of a table for a MRUPD command based on seven CA pins.

Figure 1A:
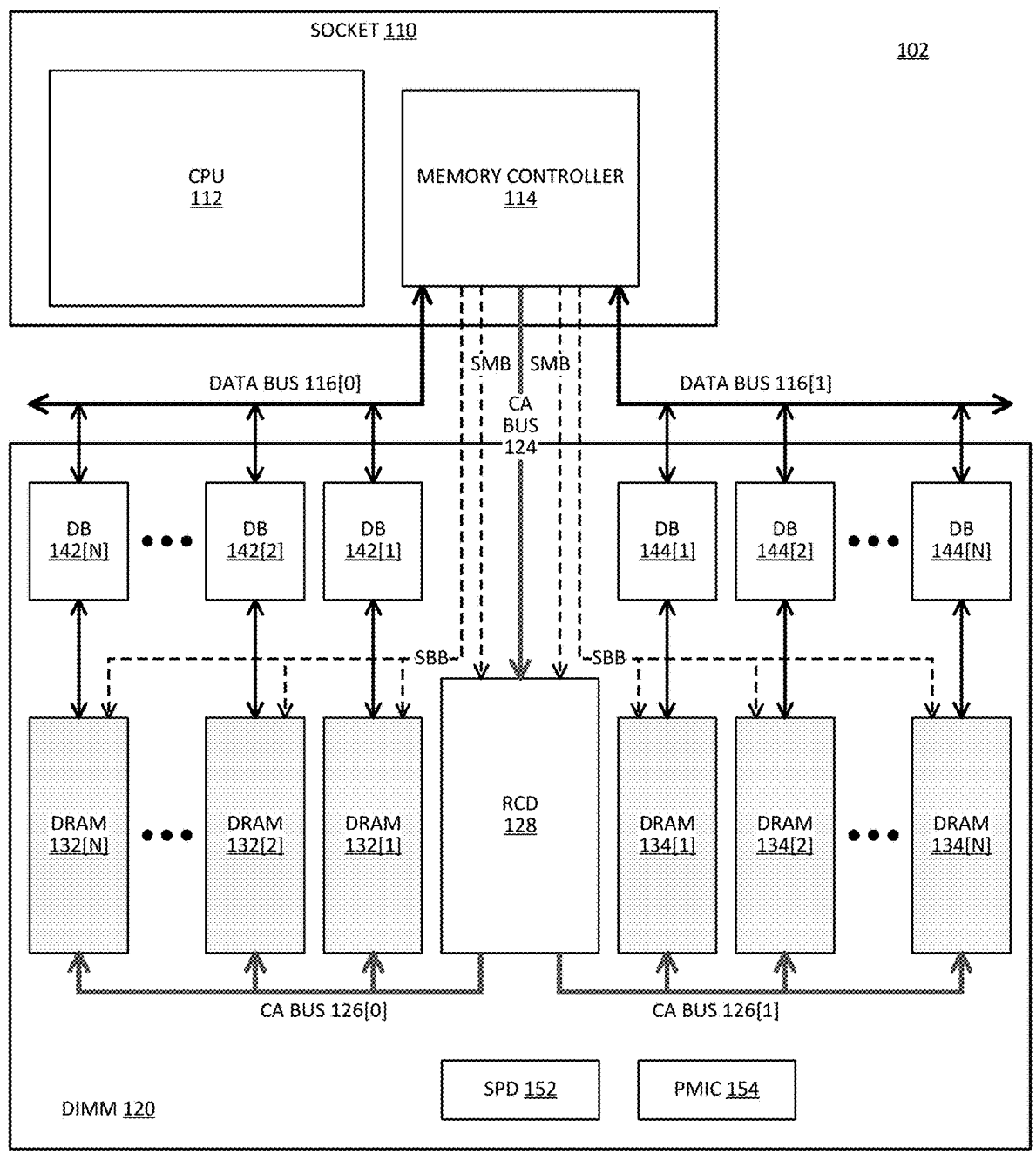
FIG. 1A is a block diagram of an example of a system with a memory module.

Descriptions of certain details and implementations follow, including non-limiting descriptions of the figures, which may depict some or all examples, and well as other potential implementations.

DETAILED DESCRIPTION OF THE INVENTION

As described herein, a configuration register update mode can be implemented as an MRUPD (mode register update) mode for a DRAM (dynamic random access memory) device. In one example, the MRUPD can also be applied to update an RCD (registering clock driver). In one example, the MRUPD can be applied to the RCD by selectively setting the RCD to a non-passthrough mode. In one example, the MRUPD can be applied to the RCD by setting a field in the commands that indicates whether the command applies to the RCD or the DRAM. In the update mode, the memory device (either the RCD or the DRAM) can perform configuration of any number of configuration registers with in-band register writes. The in-band register writes can be used to configure DFE (decision feedback equalization) settings, as well as other configuration settings for non-DFE configurations of a memory device interface.

As described herein, in-band communication can be used for the training of any DRAM register or RCD register before the CS (chip select) is trained. The use of the MRUPD mode can be used for the updating of other registers avoids the use of the SMBus (system management bus), increasing the speed of training and setup. The MRUPD extends the idea of register updating with in-band communication. The use of MRUPD can replace at least some MPC (multipurpose command) operations. When the buses are not fully trained, the system can use in-band communication to train.

What is described herein can be used for all training steps and extended to MRUPD to accelerate training algorithms and allow any MRs (mode registers) to be updated through the MRUPD mode. The information below describes examples of applying an MR update mode. After exiting MRUPD mode, the system can perform regular single cycle MRW (mode register write) or MRUPD command to update any register. The ability to update the registers with MRUPD simplifies host commands. Additionally, the system does not need different commands for different operations before training or after training and during runtime for adjusting mode registers; rather, all states can use the same commands, simplifying the command operation for the host.

The MRUPD mode described can replace operations that are currently performed through the use of MPC commands with MRUPD operations and mode register access. The ability to replace MPC operation with MRUPD operation can reduce the growing need for MPC opcodes; otherwise, the opcode table could quickly run out. In one example, MRUPD operation can be used to set CA DFE (command/address decision feedback equalization), CS DFE (chip select decision feedback equalization), and CS/CA Vref (chip select/command/address voltage reference) sweeps. The Vref sweeps applies different values of Vref settings to set the voltage that provides the best system performance.

In one example, the MRUPD mode enables the system to ungate registers which are accessible only through MRW (mode register write). The increased access to the registers improves the ability for subsequent DRAM architectures that are expected to have CA/CS DFE/Vref sweeps that require a larger number of registers to be configured during the training phases. For example, with 10-20 CA DFE 1-tap settings times 10-20 Vref settings time 2 gain settings for 8 pattern registers, the system can have roughly 800 register accesses as a starting point. There are expected to be similar significant register access sequences for CS Vref sweeps, and CS DFE, which are currently predicted to grow the MPC opcode table significantly. With the ability to access the registers through MRUPD, with quicker access compared to MPC operation, the time and efficiency of training can improve significantly.

The MRUPD mode can reduce the total number of commands needed by the host system for the command truth table. For example, the ability to train through MRUPD can eliminate the need for commands such as Vref CA, Vref CS, and MPC. Removing these commands saves encoding options for future command uses. In one example, the functions provided by the commands can be moved to MR register configuration for the DRAM to know the exact operation that needs to be executed. In one example, the system has no restriction on accessing MRs using MRUPD or MRW.

The MRUPD mode can improve the time and efficiency of initialization and training. In one example, the host at runtime can implement a ZQCAL (impedance calibration) through a single cycle MRW instead of sending an MPC. MRUPD is an inband command, which avoids usage of a sideband. In one example, the system can have default settings (e.g., DFE, ODT (on-die termination), Vref) for higher speed operation during normal mode. The system can write the default settings to mode registers using the MRUPD mode, optionally using M3C (memory module management control) bus for debug.

In one example, the system can apply the MRUPD mode for the DRAM to automate any DFE or Vref sweep with inbuilt logic. Currently, MRW cannot be used to access MPC-bound registers, which refers to registers that are associated with access via an MPC operation. By eliminating the MPC operation for the register, the registers could be accessed with MRW commands via the MRUPD mode.

In one example, the system can combine RWUPD (register word update) and MRUPD. Instead of needing a separate RWUPD for the RCD, the system can selectively apply the MRUPD commands to either the RCD or the DRAM, depending on selection of the target device in the command (e.g., through use of a bit in the command). In one example, the system integrates MRUPD and MRW as multicycle commands during initialization and training, and after training the system can use a single cycle MRUPD command which can do the MRW work as well, which reduces the number of commands.

FIG. 1A is a block diagram of an example of a system with a memory module. System 102 includes socket 110 coupled to DIMM (dual inline memory module) 120. Socket 110 represents a CPU (central processing unit) socket, which can include CPU 112 and memory controller 114. DIMM 120 includes multiple DRAM devices. DIMM 120 represents any type of memory module, which can be a DIMM or a CAMM (compression attached memory module).

System 102 illustrates an example of a system with memory devices that share a control bus or command bus (CA (command/address) bus 126[0] for one channel and CA bus 126[1] for the other channel) and data buses (data bus 116[0] for the one channel and data bus 116[1] for the other channel). The memory devices are represented as DRAM (dynamic random access memory) devices. Each channel has N DRAM devices, DRAM 132[1:N] (collectively, DRAM devices 132) for one channel, and DRAM 134[1:N] (collectively, DRAM devices 134) for the other channel, where N can be any integer. In one example, N includes one or more (ECC (error checking and correction) DRAM devices in addition to the data devices. Each DRAM device 132 and each DRAM device 134 can represent a memory chip with a command bus interface to memory controller 114, where the interface can be through RCD 128.

In one example, the two separate channels share CA bus 124 connection between memory controller 114 and RCD 128. In one example, the separate channels will have separate CA buses. The DRAM devices can be individually accessed with device specific commands and can be accessed in parallel with parallel commands.

RCD (registering clock driver) 128 (which can also be referred to as a registered clock driver) represents a controller for DIMM 120. In one example, RCD 128 receives information from memory controller 114 and buffers the signals to the various DRAM devices. By buffering the input command signals from memory controller 114, the controller only sees the load of RCD 128 on the command/address (CA bus 124), which can then control the timing and signaling to the DRAM devices.

In one example, RCD 128 controls the command signals to DRAM devices 132 through CA bus 126[0] and controls the signals to DRAM devices 134 through CA bus 126[1]. In one example, RCD 128 has independent command ports for separate channels. In one example, DIMM 120 includes data buffers to buffer the data bus signals between the DRAM devices of DIMM 120 and memory controller 114.

Data bus 116[0] provides a data bus for DRAM devices 132, which are buffered with DB (data buffer) 142[1:N] (collectively, DBs 142). Data bus 116[1] provides a data bus for DRAM devices 134, which are buffered with DB 144[1:N] (collectively, DBs 144). System 102 illustrates a one-to-one relationship between data buffers and DRAM devices. In one example, there are fewer data buffers than DRAM devices, with DRAM devices sharing a data buffer.

CA bus 126[0] and CA bus 126[1] (collectively, CA buses 126) are typically unilateral buses or unidirectional buses to carry command and address information from memory controller 114 to the DRAM devices. Thus, CA buses 126 can be multi-drop buses. Data bus 116[0] and data bus 116[1], collectively data buses 116, are traditionally bidirectional, point-to-point buses.

In one example, memory controller 114 includes one or more sideband bus connections to other devices in system 102. The sideband buses refer to buses other than CA bus 124 and other than data buses 116. As illustrated, memory controller 114 has SMBus (system management bus, illustrated in system 102 as "SMB" for simplicity) to connect to RCD 128. In one example, memory controller 114 has the SMBus connection or other SBB (sideband bus) to connect to the DRAM devices. In one example, the SBB connection represents a M3C (memory module management control) bus. Both the SMBus and SBB connections represent sideband bus communication in system 102.

The sideband bus enables memory controller 114 to provide a command to a device through a connection other than the CA bus. Communication on a sideband bus is not in-band, because the command is not received on the CA bus. In one example, the communication on the sideband bus enables memory controller 114 to send commands to trigger a device into a pre-training update mode that uses in-band communication to perform configuration updates.

In one example, DIMM 120 includes PMIC (power management integrated circuit) 154 to manage power states and power usage for the memory. The power states can affect the use of the interface between memory controller 114 and DIMM 120.

In one example, DIMM 120 includes SPD (serial presence detect) 152. SPD 152 provides information about the components on DIMM 120. SPD 152 enables memory controller 114 to automatically access information about the components. The system can adjust the configuration of the components as needed for improved communication between memory controller 114 and the memory devices.

In one example, system 102 supports an RWUPD mode to configure the RCD interface to CA bus 124. In one example, system 102 supports an MRUPD mode to configure the DRAM devices. The configuration of the DRAM devices can include configuration of the data bus interface, configuration of the CA bus interface, or configuration of both the CA bus interface and the data bus interface. With the update modes, system 102 supports writing configuration parameters in-band prior to training the CS (chip select).

With the update modes, in one example, system 102 can accelerate backside and front side training for all parametric sweeps. With the increase of in-band commands to perform the configuration, system 102 can reduce sideband bus usage. Due to the significant difference in speed between in-band communication and out-of-band communication (e.g., sideband bus usage), where in-band communication can be orders of magnitude faster, the use of in-band communication for configuration updates can improve system boot time.

CA bus 124 provides a link for memory controller 114 to provide command and address information to identify a command to be executed, and the address for execution of the command. It will be understood that the interface to the command bus (e.g., CA bus 124) can be trained to identify preferred settings to ensure proper receipt of the commands at RCD 128. The training can include iterating through different configuration settings to determine a setting with the best performance, which can vary from system to system.

With the introduction of a DDR (double data rate) mode for command buses, the interface to the command bus can include DFE (decision feedback equalization) with multiple taps (e.g., 2 or 4 taps) to ensure a proper data eye on the CA signal lines. DFE refers to a nonlinear equalization circuit that utilizes information about prior bits received to determine a current bit being received and processed. Other configuration settings can include reference voltage settings, current settings, and other configuration settings. The training sets the parameters to ensure proper communication on the command bus.

In one example, where system 102 supports an MRUPD mode, the update mode can reduce or eliminate the need for multipurpose commands (MPC commands) for configuration. In one implementation, system 102 can replace MPC commands, replace voltage reference for chip select (VrefCS) command, and replace voltage reference for command/address (VrefCA) command. Full use of the MRUPD mode for all training can enable removal of the MPC encoded opcode table. Alternatively, a system can limit the opcode to a few commands. Both removing and reducing the MPC opcodes can save hardware logic within the DRAM devices.

In one example, the MRUPD mode can be applied for either the DRAMs or the RCD. The RCD can receive the command and determine if the command applies to the DRAM configuration or the RCD configuration. If the command applies to the RCD, the RCD can apply the commands for its own configuration. If the command applies to the DRAM, the RCD can pass the command through to the selected DRAM.

The MRUPD mode described can enable configuration for all possible training modes. In one example, enabling the configuration for all training modes includes the following: triggering the device to enter the update mode issues configuration write operations with two commands, including one for the register address, and another for the configuration data value. The register write operations are in-band command, which speeds up the setting of configuration.

What is described above can work for the CA bus in double data rate DDR mode. If the DRAM defaults to the MRUPD mode/state right after power-on, the system can perform MRUPD before CSTM (chip select training mode) and before CATM (command/address training mode). Such operation can set up termination and Vref values through an in-band command rather than using sideband communication. While the MRUPD can replace MPC with a single cycle command, it may require a multicycle chip select feature.

In one example, the MRUPD can apply to either a DRAM device or to an RCD. Thus, the system can use an MRUPD command where an RWUPD command would normally be used. In one example, if the system includes an RCD, the memory controller can signal whether the MRUPD command is for the RCD or the DRAM. The MRUPD could potentially replace MRW (mode register write) and MRR (mode register read) commands. In such a case, MRUPD with a single cycle could be used in place of an MRW command.

Figure 1B:
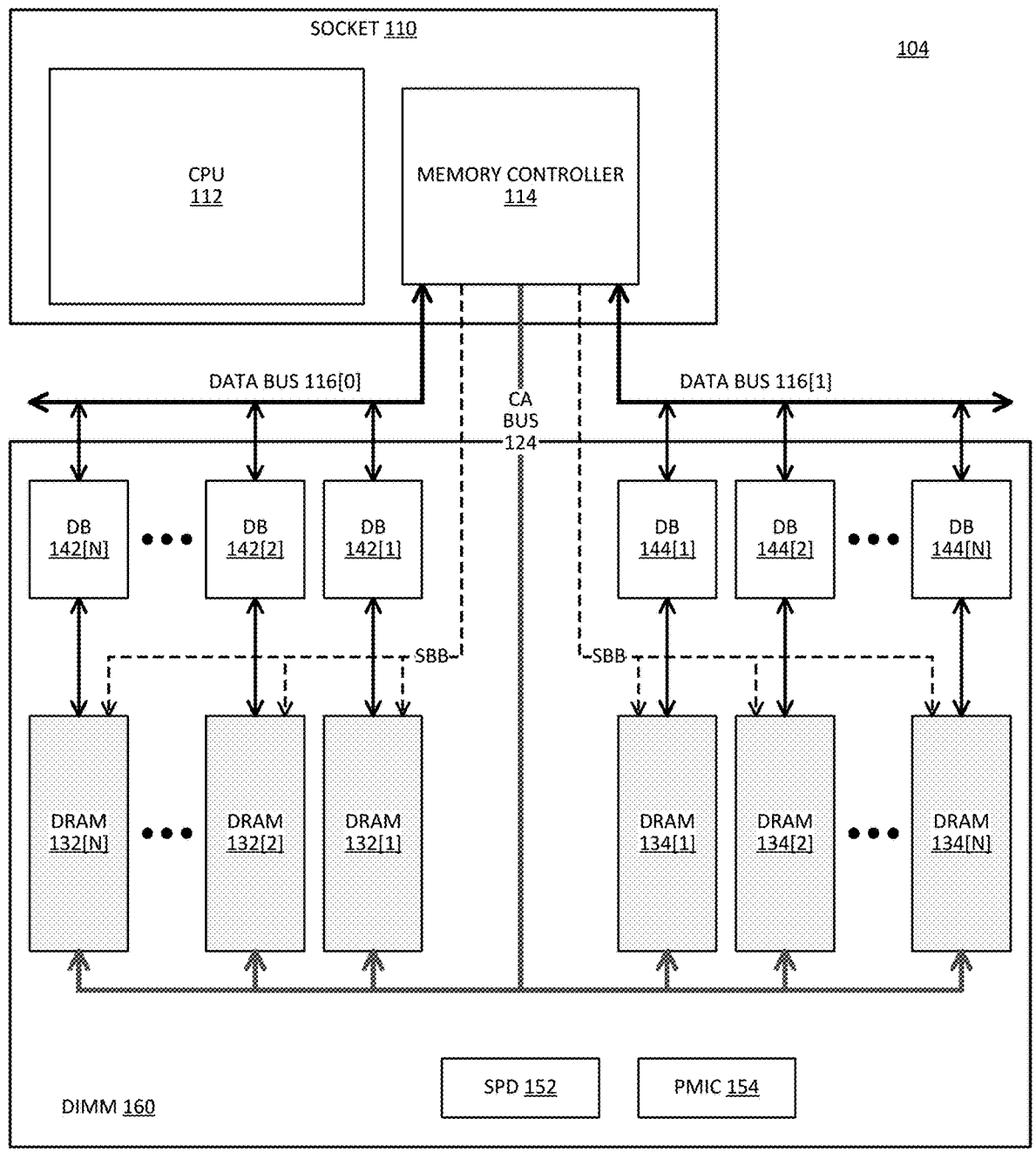
FIG. 1B is a block diagram of an example of a system with an unregistered memory module.

An MRUPD command with multiple cycles/phases can be used in place of MPC (multipurpose) commands. In one example, a system enabled for MRUPD would not need to send multiple MPC commands to update configuration settings. Rather, the memory controller would only need to send an MRUPDE to enter MRUPD mode, then keep sending data until sending an MRUPDX to exit the MRUPD mode. In one example, FIG. 1B is a block diagram of an example of a system with an unregistered memory module. System 104 includes multiple components the same as what is described in system 102. Where system 102 includes RCD 128, and is thus an RDIMM (registered DIMM), system 104 has DIMM 160, which is a UDIMM (unregistered DIMM) or CAMM.

In system 104, CA bus 124 directly connects memory controller 114 to the DRAM devices. In one example, a single CA bus 124 is used, as illustrated, where different channels can use different time slices of the CA bus. In one example, instead of using a single CA bus, the system can use separate system buses to the separate channels.

Figure 2:
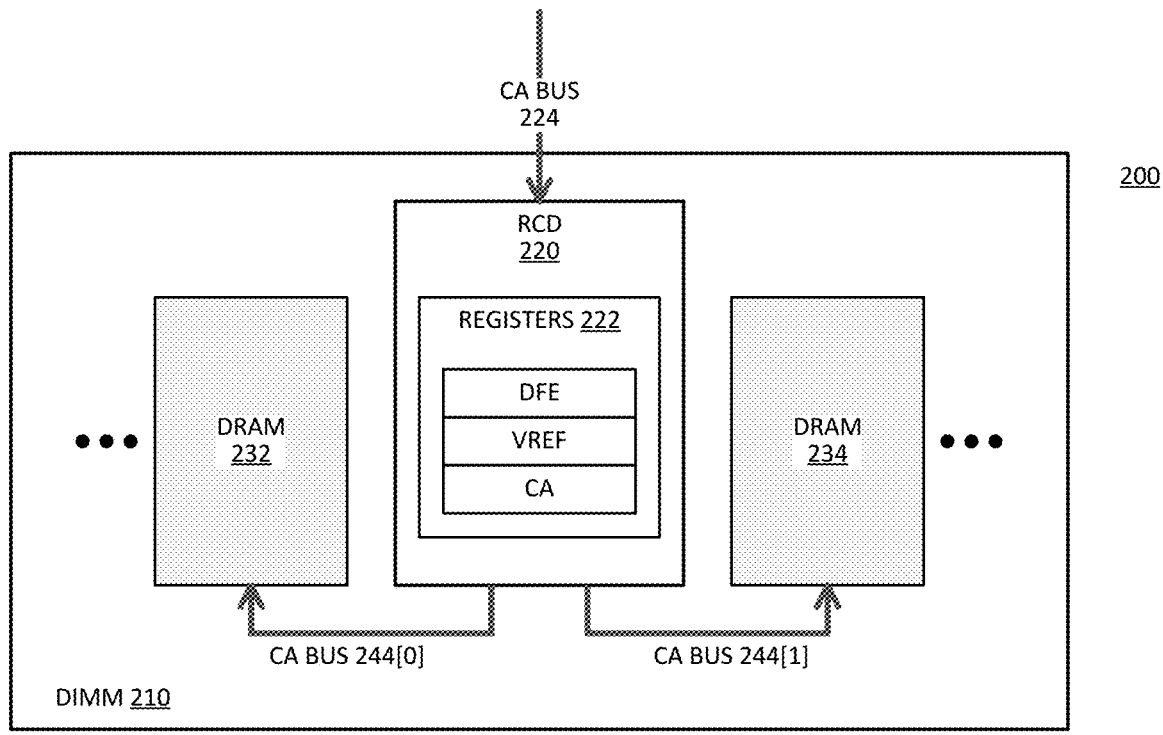
FIG. 2 is a block diagram of an example of a memory module with an RCD having an in-band configuration mode through MRUPD.

FIG. 2 is a block diagram of an example of a memory module with an RCD having an in-band configuration mode. System 200 illustrates a system in accordance with an example of system 102 or system 104.

System 200 includes dual inline memory module (DIMM) 210, which represents a memory module with a module controller. RCD 220 represents the module controller. RCD 220 connects to a host (not specifically illustrated) via CA bus 224. RCD 220 has an interface to CA bus 224, which can be configured through setting values of registers 222.

Registers 222 can include, but are not limited to, DFE settings and termination settings. Each register can include one or more configuration setting. Registers 222 specifically illustrates DFE to represent configuration settings for the DFE for CA bus 224, VREF to represent Vref configuration settings, and CA to represent other settings such as termination settings or other configuration for CA bus 224.

RCD 220 can connect to DRAM devices 232 via CA bus 244[0] and to DRAM devices 234 via CA bus 244[1]. In one example, the configuration of registers 222 applies to the interface to CA bus 224, and the DRAM devices will have separate configuration for the CA bus interconnection from RCD 220.

Applying an MRUPD mode for RCD 220 can enable system 200 to finish DCSTM with the MRUPD mode, applying in-band communication to set the configuration. In one example, RCD 220 enters MRUPD with SMBus communication, and exits MRUPD in response to a CS assertion. In one example, system 200 has a setup/configuration qualifier when RCD 220 is in MRUPD. The qualifier can be, for example, a chip select (e.g., DCS0/1), where assertion of the chip select can determine which channel is configured. In one example, each training mode can indicate which qualifier is used for the specific training.

In one example, the host can send the register address (e.g., RW address) and opcode for the MRUPD operation, and internally loop through the update operations (e.g., with hardware acceleration) using an MRUPD qualifier. In one example, system 200 triggers RCD 220 to exit MRUPD with a write to an RCD register (RW32) or through an SMBus command. In one example, registers 222 can include the RW32 RCD register.

Figure 3:
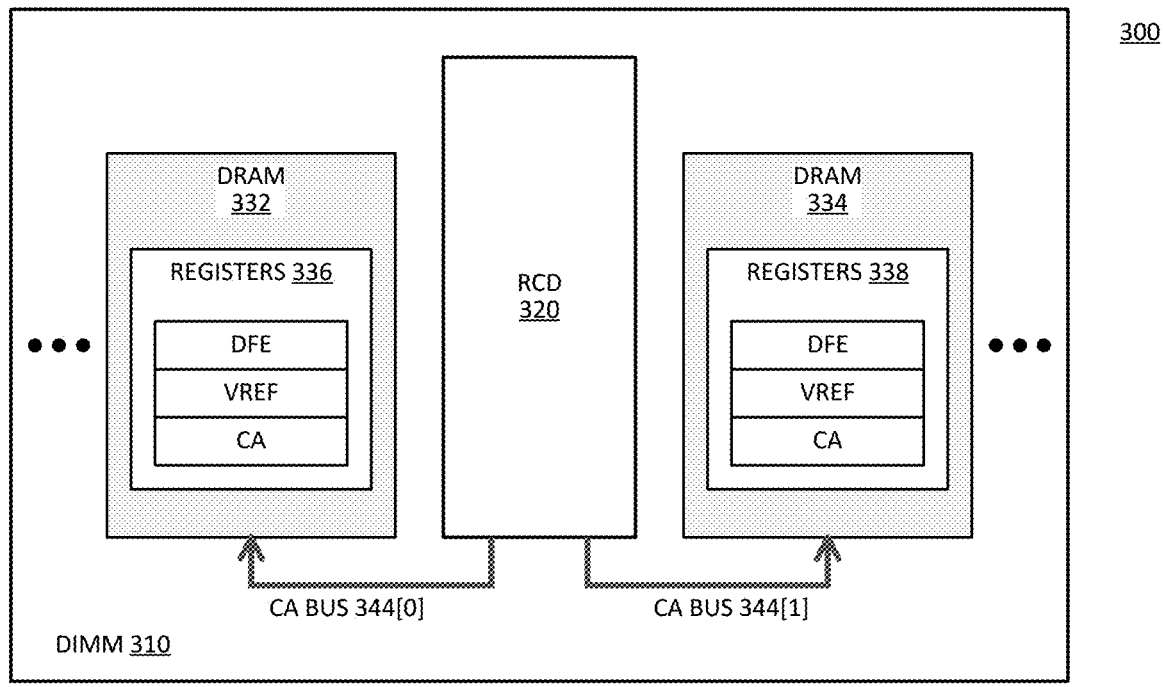
FIG. 3 is a block diagram of an example of a memory module with memory devices having an in-band configuration mode through MRUPD.

FIG. 3 is a block diagram of an example of a memory module with memory devices having an in-band configuration mode. System 300 illustrates a system in accordance with an example of system 102 or an example of system 200.

System 300 includes dual inline memory module (DIMM) 310, which represents a memory module with a module controller. RCD 320 represents the module controller. RCD 320 connects to a host (not specifically illustrated).

RCD 320 can connect to DRAM devices 332 via CA bus 344[0] and to DRAM devices 334 via CA bus 344[1].

In one example, DRAM devices 332 include registers 336 and DRAM devices 334 include registers 338. In one example, the configuration of registers 336 applies to the interface of DRAM devices 332 to CA bus 344[0]. In one example, the configuration of registers 338 applies to the interface of DRAM devices 334 to CA bus 344[1].

Registers 336 and registers 338 can include, but are not limited to, DFE settings and termination settings. Registers 336 and register 338 specifically illustrate DFE to represent a DFE configuration register to store one or more configuration settings for the DFE for the CA buses, VREF to represent Vref configuration settings, and CA to represent other settings such as termination settings or other configuration for the CA buses. In one example, MRUPD can apply to all configuration settings in the DRAM devices for the CA buses. MRUPD can provide a training mode for all configuration register training for the CA bus. Thus, system 300 can include a DFE configuration register and multiple additional configuration registers for additional configuration settings.

System 300 enables a DRAM mode register update (MRUPD) mode. In one example, the MRUPD mode has an MRUPDE (MRUPD entry) and MRUPDX (MRUPD exit). In one example, MRUPD applies to DDR6 (double data rate version 6). In one example, MRUPD is used in conjunction with an M3C bus. An application of MRUPD mode can replace MPC commands, VrefCA and VrefCS commands. Without such commands, the MPC opcode table would not be required. Removal of the table saves logic in the DRAM and enables the mode register to be accessed any time, and without restriction to any set.

In one example, MRUPD in DRAM provides an update mode to be used by the DRAM for all training steps. With the proposed MRUPD, to sweep any parameter, the system does not need to go through SMBus access, which is significantly slower than in-band commands. Performing training through the in-band access accelerates the backside training steps such as CSTM, CATM, and DFE training algorithms and improves system boot time.

In one example, the in-band register writes are MRWs (mode register writes) based on commands on the command bus prior to execution of a CATM. In one example, system 300 provides a first MPC to enter MRUPD mode. A second MPC can trigger an exit from the MRUPD mode.

Figure 4A:
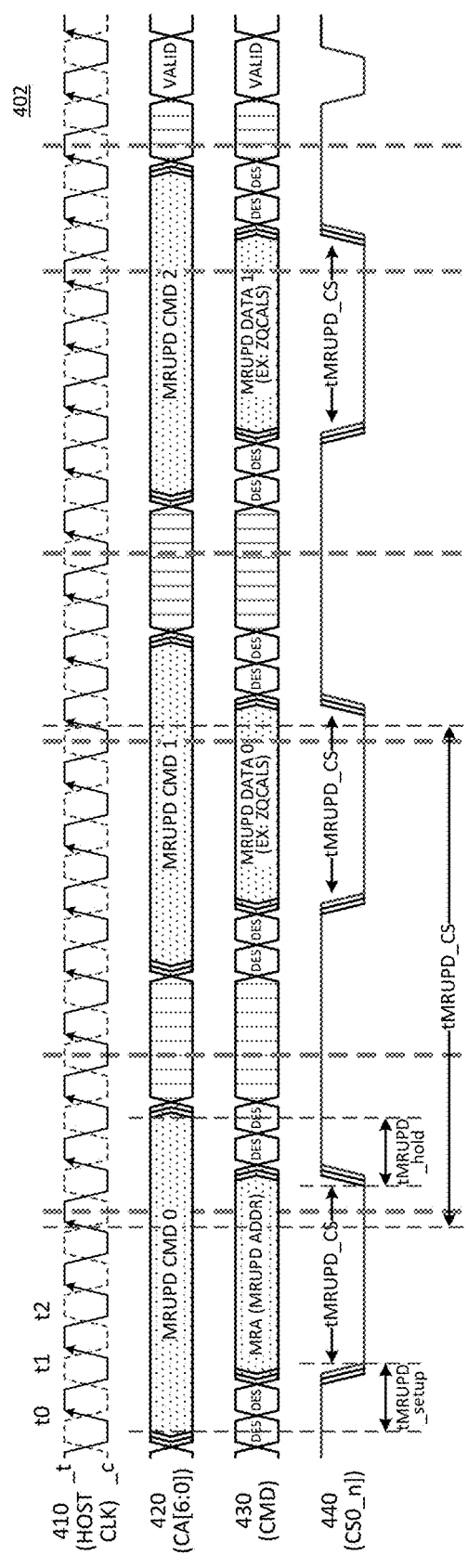
FIG. 4A-4B are timing diagram examples of MRUPD command timing.

FIG. 4A is a timing diagram example of MRUPD command timing. Diagram 402 illustrates one timing diagram for MRUPD command timing. Diagram 402 illustrates various signals and example sequences over time. The thick dashed lines represent time breaks, thus indicating that the number of clock cycles involved in the signaling can vary from what is illustrated.

Signal 410 represents the host clock (CLK), which has CK_t (clock primary) and CK_c (clock complementary) signals, which represent the timing signals. Signal 420 represents the command and address signal lines, CA[6:0] (command/address bits 6 to 0), which represents a command sent by the host. Signal 430 represents the internal command signal, CMD (command). The CMD signal represents the decoded operation internal to the DRAM device in response to the host command. Signal line 440 represents the chip select. CS0_n (chip select 0, enumerated for each separate DRAM device) represents a chip select for the target DRAM device that will be configured with the MRUPD.

The CA signal illustrates MRUPD Command 0, MRUPD Command 1, and MRUPD Command 2 for the training sequence. After training, the CA signal can send any Valid command. After training, the CMD can similarly generate any Valid command, with a single cycle CS assertion on the CS signal.

In one response to MRUPD Command 0, the CMD can be MRUPD ADDR (address, or MRA (MRUPD address)), while the CS signal can assert the CS signal for a time of tMRUPD_CS (timing for a CS signal in MRUPD mode). MRUPD Command 0 can be an MRUPD mode command that triggers entry into MRUPD mode. In one example, there is time of tMRUPD_setup (setup time for MRUPD mode) before the CS assertion, and a time of tMRUPD_hold (hold time for the MRUPD mode) after the CS assertion.

In one response to MRUPD Command 1, the CMD can be MRUPD Data 0, such as a ZQCALS (impedance calibration start), or any other training mode, while the CS signal can assert the CS signal for a time of tMRUPD_CS. Similarly, in one response to MRUPD Command 2, the CMD can be MRUPD Data 1, such as a ZQCALS, or any other training mode, while the CS signal can assert the CS signal for a time of tMRUPD_CS.

Diagram 402 illustrates the use of a multicycle CS used during MRUPD mode. The multicycle CS is used to allow the DRAM time to latch the signal, because there is no Vref CS, no Vref CA, or other training. After the training, the CS0_n signal line illustrates a normal single cycle CS. With the multicycle CS signal, the system can clearly identify the DRAM that is either in MRUPD mode (until CS/CA are trained) or in normal mode.

In diagram 402, in one example, the host writes to an MR register field MRUPDX using MRUPD to exit. The DRAM can exit MRUPD to perform any valid single cycle CS based commands (e.g., a read with a timing of tMRD (time for memory read)) and MRUPD single cycle commands. Thus, the system can perform configuration updates for CS and can perform configuration updates for the CA.

Figure 4B:
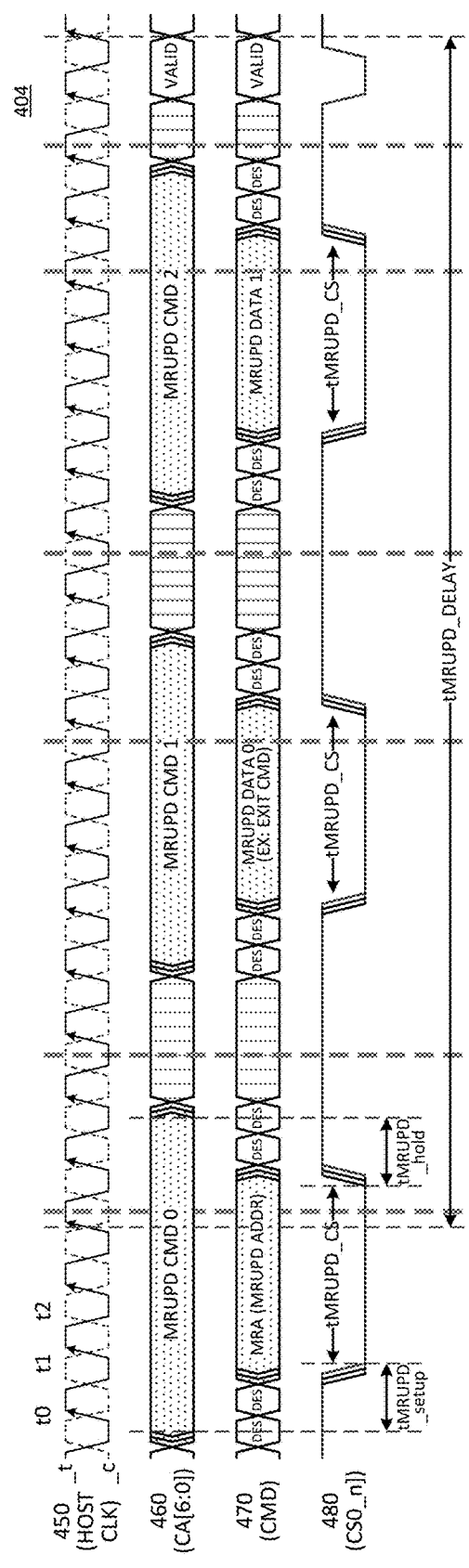

FIG. 4B is a timing diagram example of MRUPD command timing. Diagram 404 illustrates another timing diagram for MRUPD exit timing. Diagram 404 illustrates various signals and example sequences over time. The thick dashed lines represent time breaks, thus indicating that the number of clock cycles involved in the signaling can vary from what is illustrated.

Signal 450 represents the host clock (CLK), which has CK_t (clock primary) and CK_c (clock complementary) signals, which represent the timing signals. Signal 460 represents the command and address signal lines, CA[6:0] (command/address bits 6 to 0), which represents a command sent by the host. Signal 470 represents the internal command signal, CMD (command). The CMD signal represents a signal for the DRAM device. Signal line 480 represents the chip select. CS0_n (chip select 0, enumerated for each separate DRAM device) represents a chip select for the target DRAM device that will be configured with the MRUPD.

The CA signal illustrates MRUPD Command 0, MRUPD Command 1, and MRUPD Command 2 for the training sequence. After training, the CA signal can send any Valid command. After training, the CMD can similarly generate any Valid command, with a single cycle CS assertion on the CS signal. Diagram 402 illustrates the timing for different phases of MRUPD, illustrating the timing of tMRUPD_PxDelay (timing between MRUPD commands), going between MRUPD Command 0 and MRUPD Command 1.

In one response to MRUPD Command 0, the CMD can be MRUPD ADDR (address, or MRA (MRUPD address)), while the CS signal can assert the CS signal for a time of tMRUPD_CS (timing for a CS signal in MRUPD mode). In one example, there is time of tMRUPD_setup (setup time for MRUPD mode) before the CS assertion, and a time of tMRUPD_hold (hold time for the MRUPD mode) after the CS assertion. Diagram 404 illustrates the timing for the MRUPD operation, illustrating the timing of tMRUPD_Delay (timing for MRUPD mode), going from the MRUPD Command 0 to the valid command after training.

In one response to MRUPD Command 1, the CMD can be an MRUPD exit command, illustrated as MRUPD Data 0, while the CS signal can assert the CS signal for a time of tMRUPD_CS. Similarly, in one response to MRUPD Command 2, the CMD can be MRUPD Data 1, which can be the extension of the exit command, while the CS signal can assert the CS signal for a time of tMRUPD_CS.

Diagram 404 illustrates the use of a multicycle CS used during MRUPD mode. The multicycle CS is used to allow the DRAM time to latch the signal, because there is no Vref CS, no Vref CA, or other training. After the training, the CS0_n signal line illustrates a normal single cycle CS. With the multicycle CS signal, the system can clearly identify the DRAM that is either in MRUPD mode (until CS/CA are trained) or in normal mode.

In diagram 404, in one example, the host writes to an MR register field MRUPDX using MRUPD to exit. The DRAM can exit MRUPD to perform any valid single cycle CS based commands (e.g., a read with a timing of tMRD (time for memory read)) and MRUPD single cycle commands.

FIG. 5A is an example of a table for register fields for training modes available through an MRUPD mode. Diagram 502 illustrates an example of DRAM mode register fields of encoded MPC opcodes. Instead of accessing the modes through an MPC operation, the modes can be triggered through MR access with an MRUPD command.

Consider a register bit field with an address or identifier of MRxx 510, with row 512. Row 512 includes fields CSTME (chip select training mode enter), CSTMX (chip select training mode exit), CATME (command/address training mode enter), CATMX (command/address training mode exit), MRUPDE (mode register update enter), and MRUPDX (mode register update exit), with other bit fields that are RFU (reserved for future use). These are merely examples, and other combinations of modes can be identified in the same mode register.

Consider a register bit field MRyy 520, with row 522. Row 522 includes fields ZQCALS (impedance calibration start), ZQCALL (impedance calibration latch), 1N, referring to the 1N mode where the first half of a two cycle command is sampled on the clock where CS is asserted, and the second half of the command is sampled on the next clock edge, and 2N, referring to the 2N mode where the first half of a two cycle command is sampled on the clock where CS is asserted, and the second half of the command is sampled two clocks after the first half, DLL (delay lock loop) reset, and MECS, with RFU fields as well.

In one example, the MRUPDX provides an exit from MRUPD mode. MRUPD training can be characterized by a multicycle CS and a 3-phase command, where the address and two data cycles represent the 3 phases. The separation into multicycle CS and 3 phases of MRUPD command helps the DRAM to sample the content reliably. In one example, the MRUPD mode will start using the MR bits fields of diagram 502, and can trigger other training modes through the MRs.

While not specifically illustrated, there can be registers identified as MRzz that have RTT_CS (read termination target for CS), RTT_CA (read termination target for CA), RTT_CK (read termination target for CK (clock)), RTT_PARK (read termination target for park), and Vref settings. In one example, MRUPD modes will start using MR bit fields provided in diagram 502 similar to and EXIT mode, to make the DRAM start on different modes. In one example, the system samples DRAM mode register fields instead of encoded MPC opcodes from a table.

FIG. 5B is a first example of a table for a MRUPD command based on seven CA pins. Diagram 504 illustrates table 530, which is a first example MRUPD 3-phase command based on having seven CA pins (CA[6:0]). If the CA pin count is reduced, the number of commands can be increased to send them multiple times.

Row 532 illustrates the first phase, Phase 0. In one example, the first phase command sends MRP[4:0] (five bits of mode register paging) and MRA[7:6] (mode register address bits 7 and 6). Row 534 illustrates the second phase, Phase 1. The second phase command can send MRA[5:0] (six least significant bits of mode register address) and OP0 (least significant opcode bit). Row 536 illustrates the third phase, Phase 2. The third phase command can send OP[7:1] (the most significant bits of the opcode). In one example, paging information can be passed through MRA[0:X], where X is an integer, to save a UI for every command. The number of bits can be what is illustrated in diagram 504, or it can be a different number, depending on the configuration of the system.

In one example, there can be 32 pages, 256 register within a page, 8-bit opcodes (data bits in the command), and 128 directly addressable registers. There can be variations in any of these values, with different number of pages, registers per page, opcode size, and directly addressable registers. The different configuration is available for different implementations of DRAM devices.

In one example, the RCD is put in passthrough mode to allow the commands to pass to the DRAMs. In one example, the RCD can be selectively put into passthrough mode, and it will pass the MRUPD commands to the DRAMs. In one example, the RCD is selectively not in passthrough mode, and it will receive the MRUPD commands as RWUPD commands for its configuration.

FIG. 5C is a second example of a table for a MRUPD command based on seven CA pins. Diagram 506 illustrates table 540, which is an example MRUPD 3-phase command based on having seven CA pins (CA[6:0]). If the CA pin count is reduced, the number of commands can be increased to send them multiple times.

Row 542 illustrates the first phase, Phase 0. In one example, the first phase command sends MA[5:0] (six bits of mode register address) and a valid bit (V). Row 544 illustrates the second phase, Phase 1. The second phase command can send MA[7:6] (the most significant mode register address bits) and OP[3:0] (the four least significant opcode bits). Row 546 illustrates the third phase, Phase 2. The third phase command can send OP[7:4] (the most significant bits of the opcode) and valid bits. In one example, a page point is available in one of the MR bits and adds data integrity (per phase/step) check in place of V.

In one example, there can be 32 pages, 256 register within a page, 8-bit opcodes (data bits in the command), and 128 directly addressable registers. There can be variations in any of these values, with different number of pages, registers per page, opcode size, and directly addressable registers. The different configuration is available for different implementations of DRAM devices.

In one example, the RCD is put in passthrough mode to allow the commands to pass to the DRAMs. In one example, the RCD can be selectively put into passthrough mode, and it will pass the MRUPD commands to the DRAMs. In one example, the RCD is selectively not in passthrough mode, and it will receive the MRUPD commands as RWUPD commands for its configuration.

Figure 6:
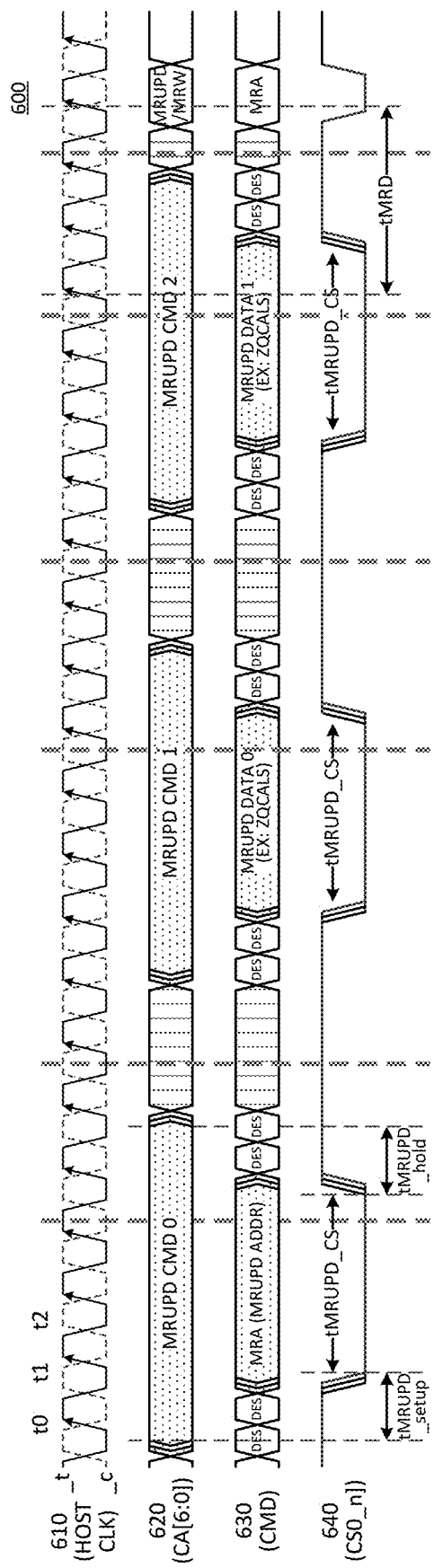
FIG. 6 is a timing diagram of an example for multicycle MRUPD commands followed by single cycle MRUPD commands.

FIG. 6 is a timing diagram of an example for multicycle MRUPD commands followed by single cycle MRUPD commands. Diagram 600 illustrates another timing diagram for MRUPD exit timing. Diagram 600 illustrates various signals and example sequences over time. The thick dashed lines represent time breaks, thus indicating that the number of clock cycles involved in the signaling can vary from what is illustrated.

Signal 610 represents the host clock (CLK), which has CK_t (clock primary) and CK_c (clock complementary) signals, which represent the timing signals. Signal 620 represents the command and address signal lines, CA[6:0] (command/address bits 6 to 0), which represents a command sent by the host. Signal 630 represents the internal command signal, CMD (command). The CMD (command) represents a signal for the DRAM device. Signal line 640 represents the chip select. CS0_n (chip select 0, enumerated for each separate DRAM device) represents a chip select for the target DRAM device that will be configured with the MRUPD.

The CA signal illustrates MRUPD Command 0, MRUPD Command 1, and MRUPD Command 2 for the training sequence. After training, the CA signal can send any valid command. After training, the CMD can similarly generate any valid command, with a single cycle CS assertion on the CS signal. Diagram 600 illustrates the timing for different phases of MRUPD, illustrating the timing of tMRUPD_PxDelay (timing between MRUPD commands), going between MRUPD Command 0 and MRUPD Command 1.

In one response to MRUPD Command 0, the CMD can be MRUPD ADDR (address, or MRA (MRUPD address)), while the CS signal can assert the CS signal for a time of tMRUPD_CS (timing for a CS signal in MRUPD mode). In one example, there is time of tMRUPD_setup (setup time for MRUPD mode) before the CS assertion, and a time of tMRUPD_hold (hold time for the MRUPD mode) after the CS assertion. Diagram 600 illustrates the timing for the MRUPD operation, illustrating the timing of tMRUPD_Delay (timing for MRUPD mode), going from the MRUPD Command 0 to the valid command after training.

In one response to MRUPD Command 1, the CMD can be an MRUPD exit command, illustrated as MRUPD Data 0, while the CS signal can assert the CS signal for a time of tMRUPD_CS. Similarly, in one response to MRUPD Command 2, the CMD can be MRUPD Data 1, which can be the extension of the exit command, while the CS signal can assert the CS signal for a time of tMRUPD_CS.

Diagram 600 illustrates the use of a multicycle CS used during MRUPD mode. The multicycle CS is used to allow the DRAM time to latch the signal, because there is no Vref CS, no Vref CA, or other training. After the training, the CS0_n signal line illustrates a normal single cycle CS.

In diagram 600, in one example, the host writes to an MR register field MRUPDX using MRUPD to exit. In one example, the DRAM can exit MRUPD to perform any single cycle MRUPD or MRW commands. The MRUPD or MRW command can identify an address, resulting in a flipping of a bit at the MRA. In one example, the timing from MRUPD Command 2 to the single cycle commands has a timing tMRD (mode register delay timing).

In one example, by not sending two different commands, the system can align the MRW with a single cycle MRUPD, simplifying the overall logic. In one example, the multicycle CS commands can be part of the MRUPD mode until the DRAM is trained, setting up DRAM VrefCA, VrefCS, CS, and CA.

After exiting MRUPD mode, in one example, the DRAM moves to a single cycle MRUPD mode where it can send MRWs to the DRAM from the host. In the single cycle MRUPD mode, MRUPD mode and MRW can be combined, as both are single cycle commands. Because CA has limited pins, MRUPD or MRW may need to be sent with more than one command as shown previously.

Figures 7A, 7B:
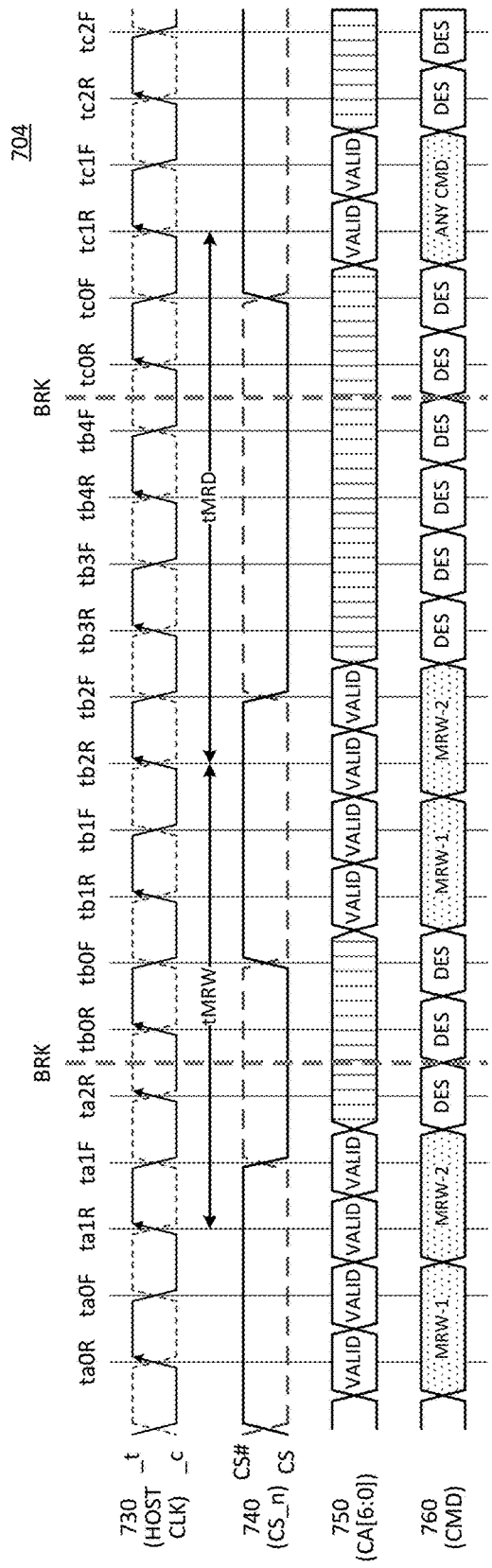
FIG. 7A is an example of a table for mode register access commands.
FIG. 7B is an example of a timing diagram for mode register access commands.

FIG. 7A is an example of a table for mode register access commands. Diagram 702 illustrates table 710, which is a different option from what is shown above. Table 710 illustrates an example of MRW/MRR (mode register write/mode register read) commands based on CA[6:0]. In one example, the system can have fewer command signal lines, such as four signal lines.

Table 710 illustrates MRW-1 in row 712 (rising edge R) and row 714 (falling edge F). Table 710 illustrates MRW-2 in row 716 (rising edge R) and row 718 (falling edge F). Table 710 illustrates MRR in row 720 (rising edge R) and row 722 (falling edge F). Row 712, row 716, and row 720 illustrate an asserted chip select, and row 714, row 718, and row 722 illustrate a "don't care" for the chip select.

MRW-1 where CA[6:0] or unshared CA[3:0]/CA[7:0] or shared CA[7:0] to send multiple MRW command encodings. As illustrated, MRW-1 has a low CS for the rising edge, and a do not care on the CS for the falling edge. For CA[0:6] on the rising edge (row 712), the bits can be the encoding (H/L, H/L, H/L, H/L), a TBD bit, and MA[0:1] respectively. For CA[0:6] on the falling edge (row 714), the bits can be MA[2:7] and a valid bit. The MRW-1 can have the command encoding and the address information.

As illustrated, MRW-2 has a low CS for the rising edge, and a do not care on the CS for the falling edge. For CA[0:6] on the rising edge (row 716), the bits can be the encoding (H/L, H/L, H/L, H/L), a TBD bit, and OP[0:1] respectively. For CA[0:6] on the falling edge (row 718), the bits can be OP[2:7] and a valid bit. MRW-2 can thus have the command encoding and the opcode data.

As illustrated, MRR has a low CS for the rising edge (row 720), and a do not care on the CS for the falling edge. For CA[0:6] on the rising edge, the bits can be the encoding (H/L, H/L, H/L, H/L), a TBD bit, and MA[0:1] respectively. For CA[0:6] on the falling edge (row 722), the bits can be MA[2:7] and a valid bit. MRR can thus have the command encoding and the register address.

FIG. 7B is an example of a timing diagram for mode register access commands. Timing diagram 704 illustrates various signals and example sequences over time. The thick dashed lines represent time breaks, thus indicating that the number of clock cycles involved in the signaling can vary from what is illustrated.

Signal 730 represents the host clock (CLK), which has CK_t (clock primary) and CK_c (clock complementary) signals, which represent the timing signals. Signal 740 represents the chip select. CS0_n (chip select 0, enumerated for each separate DRAM device) represents a chip select for the target DRAM device that will be configured with the MRUPD. Signal 750 represents command and address signal lines, CA[6:0] (command/address bits 6 to 0), which represents a command sent by the host. Signal line 760 represents the internal command signal, CMD (command). The CMD signal represents a signal for the DRAM device.

Signal 740 illustrates the chip select asserted at ta0R (time a0, rising edge), with a valid command on signal 750 and MRW-1 on signal 760. The signals continue at ta0F (time a0, falling edge). At time ta1R, signal 760 illustrates MRW-2. At time ta1F, signal 740 illustrates an edge transition for CS. Time ta2R illustrates a de-asserted CS, and a deselect command (DES) on signal 760.

At time tb0R, signal 760 illustrates DES, with CS de-asserted. At time tb0F, signal 740 illustrates an edge transition for the CS assertion, and another DES on signal 760. Time tb1R illustrates CS asserted, a valid command on signal 750, and MRW-1 on signal 760. Time tb1F illustrates CS asserted, a valid command on signal 750, and MRW-1 on signal 760.

Time tb2R illustrates CS asserted, a valid command on signal 750, and MRW-2 on signal 760. Time tb2F illustrates an edge transition for CS, a valid command on signal 750, and MRW-2 on signal 760. At time tb3R, time tb3F, time tb4R, tb4F, and tc0R all illustrate CS de-asserted and DES on signal 760. At time tc0F, signal 740 illustrates a CS transition, with DES on signal 760. At time tc1R and time tc1F, signal 740 illustrates CS asserted, valid on signal 750, and any command (CMD) on signal 760.

The chip select is asserted for the MRW commands. The CA signal line only needs to be valid to enable the mode register commands to be submitted. The CMD signal line illustrates MRW-1 and MRW-2 commands sent sequentially when the CS is asserted. The time for MRW (tMRW) is from ta1R to tb2R, and the time for MRD (tMRD) is from tb2R to tc1R.

Figure 8:
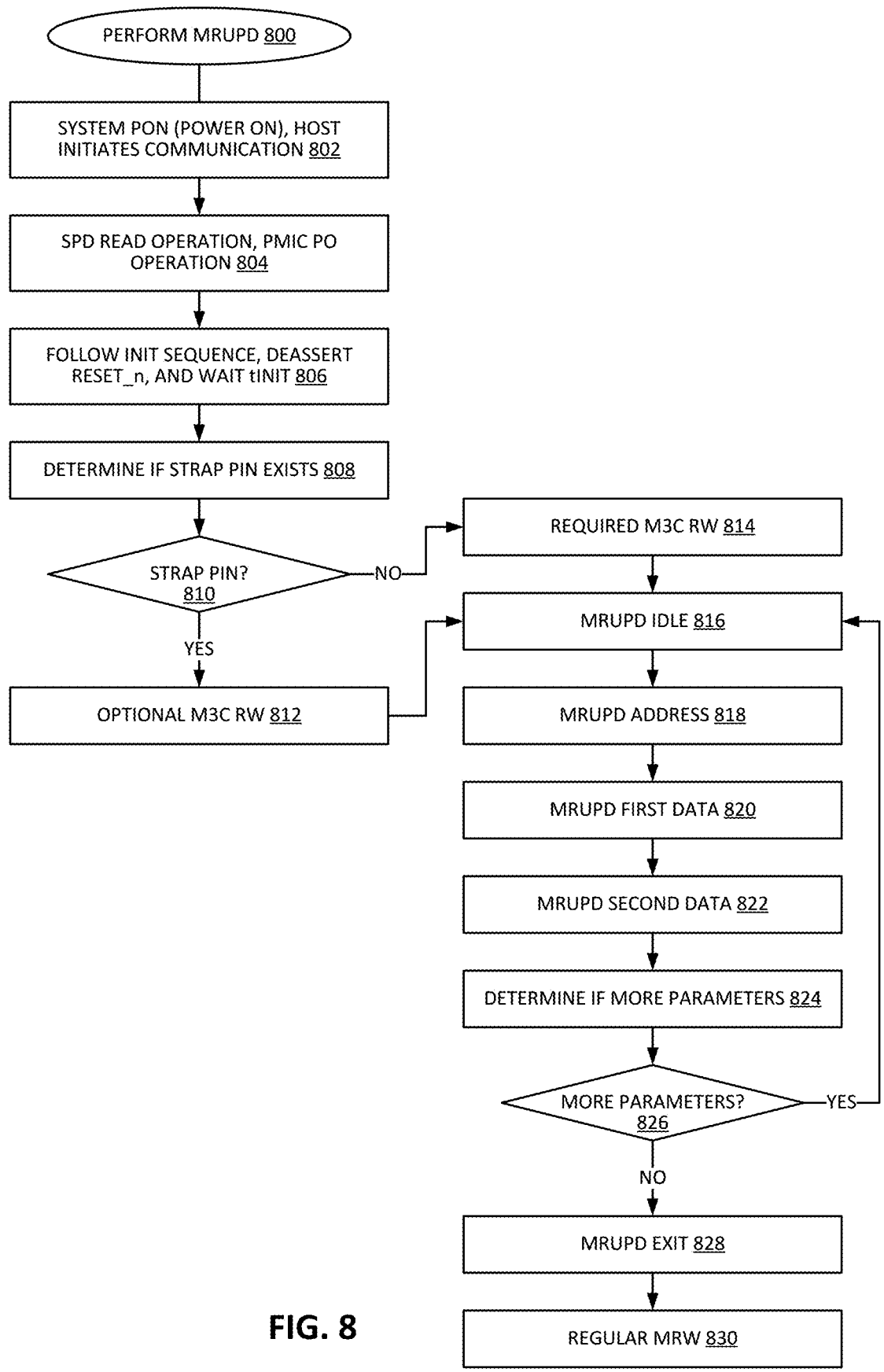
FIG. 8 is a flow diagram of an example of a process for MRUPD.

FIG. 8 is a flow diagram of an example of a process for MRUPD. Process 800 represents a process flow for in-band DRAM configuration with MRUPD. After system PON (power on), the host can initiate communication, at 802. In one example, the system powers on (PON) the DRAM and by default enters MRUPD mode, which can be part of the reset flow. The system can optionally perform an M3C operation to enter MRUPDE/MRUPDX during debug, to enter the MRUPD mode.

The system can perform operations to read the SPD and power on the PMIC, at 804. The system can follow a standards-based initialization sequence, including initiating the M3C bus, de-asserting the Reset_n signal, and waiting for an initialization period (e.g., tINIT3), at 806.

In one example, the system determines if there is a strap pin, at 808. If there is a strap pin, at 810 YES branch, in one example, there is an optional M3C RW (register word) update (e.g., for an RCD, or a mode register update for the DRAM) for the CS/CA and for ODT/Vref, at 812. If there is not a strap pin, at 810 NO branch, in one example, the M3C register write is required, at 814.

In one example, the MRUPD mode follows three operations: MRUPD Entry/Idle, MRUPD operation with address and data, and MRUPD exit, to perform a regular MRW. The system can perform MRUPD idle, at 816. The system can send an MRUPD address command, at 818, send an MRUPD command with a first portion of data, at 820, and a second MRUPD command with a second portion of data, at 822.

The system can use the MRUPD mode operations to set up the DLL, and to train ZQCal, ODT, and Vref. The MRUPD mode operations can also be used for CSTM Entry, CATM Entry, and DFE training. In one example, after setting a parameter, the system determines if there are more parameters to set, at 824. If there are more parameters to configure, at 826 YES branch, the system can return to MRUPD idle, at 816. If there are no more parameters to configure, at 826 NO branch, the system can trigger MRUPD exit, at 828. After exiting MRUPD, the system supports regular MRW to set configuration, at 830.

In one example, the system uses MRUPD to configure all required DRAM mode registers using the same DRAM CS as a qualifier for the MRUPD. In one example, the system applies a multicycle CS for MRUPD to get into the CSTM training (write to the MR field) and CA with all zeros (0's) to exit the CSTM. Optionally, M3C can be used for initialization/debug for terminations, Vref, and other parameters. The M3C can initiate the terminations and Vref settings, and MRUPD inband commands can be used for any parameter sweeps to speed up with the help of DRAM sweep acceleration logic. The system can similarly use an identifier for the RCD to set RCD configuration registers.

Figure 9:
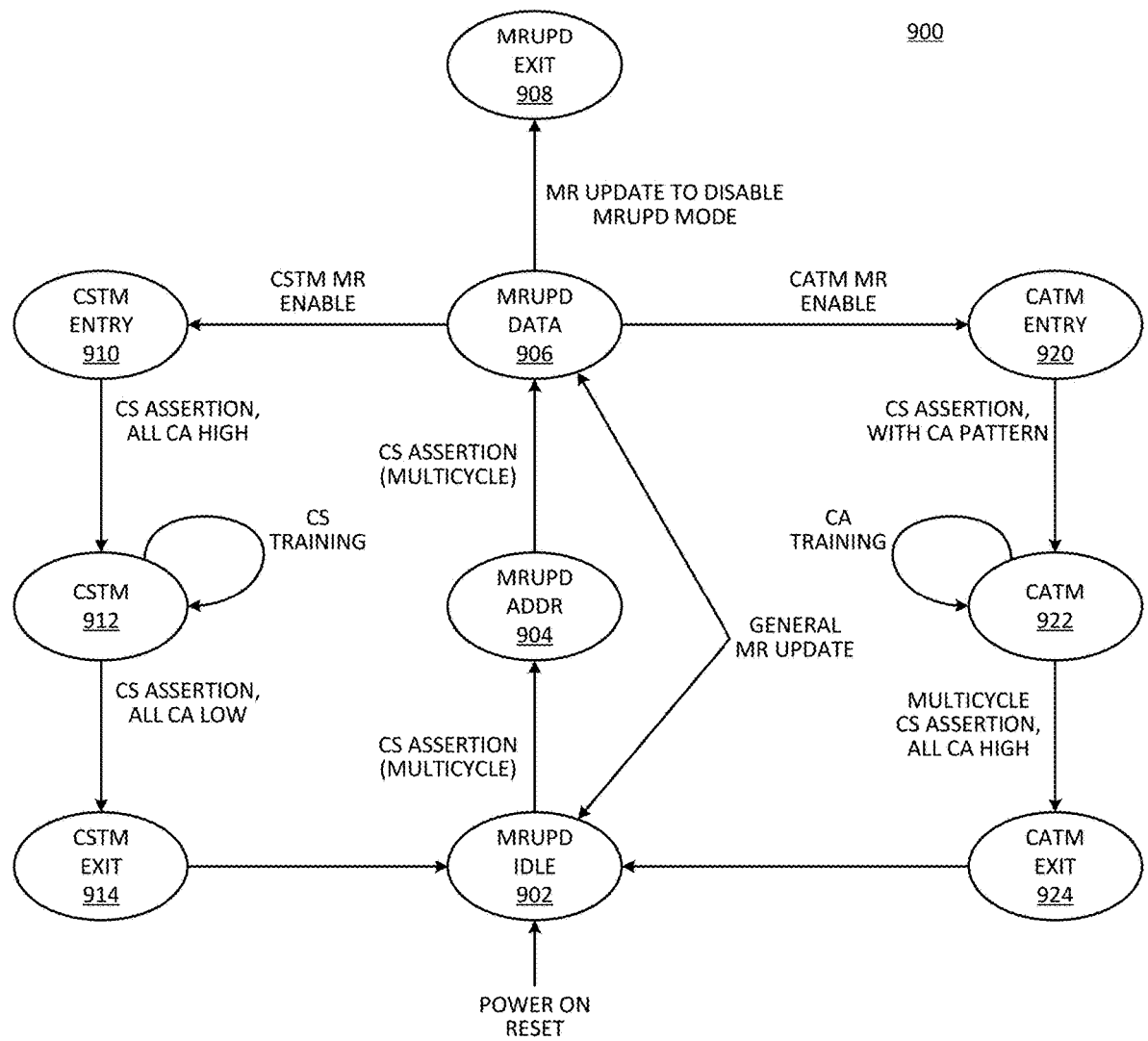
FIG. 9 is a state diagram of an example of MRUPD.

FIG. 9 is a state diagram of an example of MRUPD. System 900 represents various states in an example MRUPD flow. In one example, in response to a power on reset, the memory enters state MRUPD idle 902, which is a state in which the memory can perform in-band training with MRUPD, but is idle in that it does not currently have any operations to perform.

In one example, as an alternative to entering MRUPD idle on power on reset, during debug time, commands on the M3C bus (which can be a subset of I3C basic). In one example, with a multicycle chip select (CS) assertion, the memory can move to state MRUPD ADDR 904. In response to a CS assertion, the selected memory device can check for an MRUPD address for a configuration update. With another CS assertion, which can also be a multicycle assertion, the memory moves to state MRUPD data 906, in which the memory device acquires the data to write to the address of the previous state.

In one example, the mode register update written can be an update that disables MRUPD mode. In response to such an update, the memory can enter state MRUPD exit 908, and exit from MRUPD mode.

In one example, 902 and 906 can represent states for general mode register updates. Such general updates are not necessarily associated with enabling a training mode. For example, the update can be used for Vref configuration. If Vref is swept outside its range, in one example, the system can use the M3C bus to recover.

In one example, MRUPD data 906 can trigger CSTM entry 910 with a mode register configuration write to enable CSTM. In one example, with a CS assertion with all CA pins set high (e.g., to a high logic state), the memory enters state CSTM 912, to perform chip select training. In one example, during the CS training, the CA pins can be held high. In one example, during CSTM, no commands are supported. Alternatively, the DRAM device can be disabled from decoding any commands.

In one example, in response to a CS assertion with all CA pins driven low, the memory can move to state CSTM exit 914. In response to exiting the CSTM mode, the memory can return to state MRUPD idle 902.

In one example, MRUPD data 906 can trigger CATM entry 920 with a mode register configuration write to enable CATM. In one example, with a CS assertion with a proper CA pattern on the CA pins (e.g., CA encoding or a CATM command), the memory enters state CATM 922, to perform CA bus training. In one example, during the CA bus training, the CA pins can be held at the CA encoding that triggers entry into CATM.

In one example, in response to a multicycle CS assertion with all CA pins driven high, the memory can move to state CATM exit 924. In response to exiting the CATM mode, the memory can return to state MRUPD idle 902.

Figure 10:
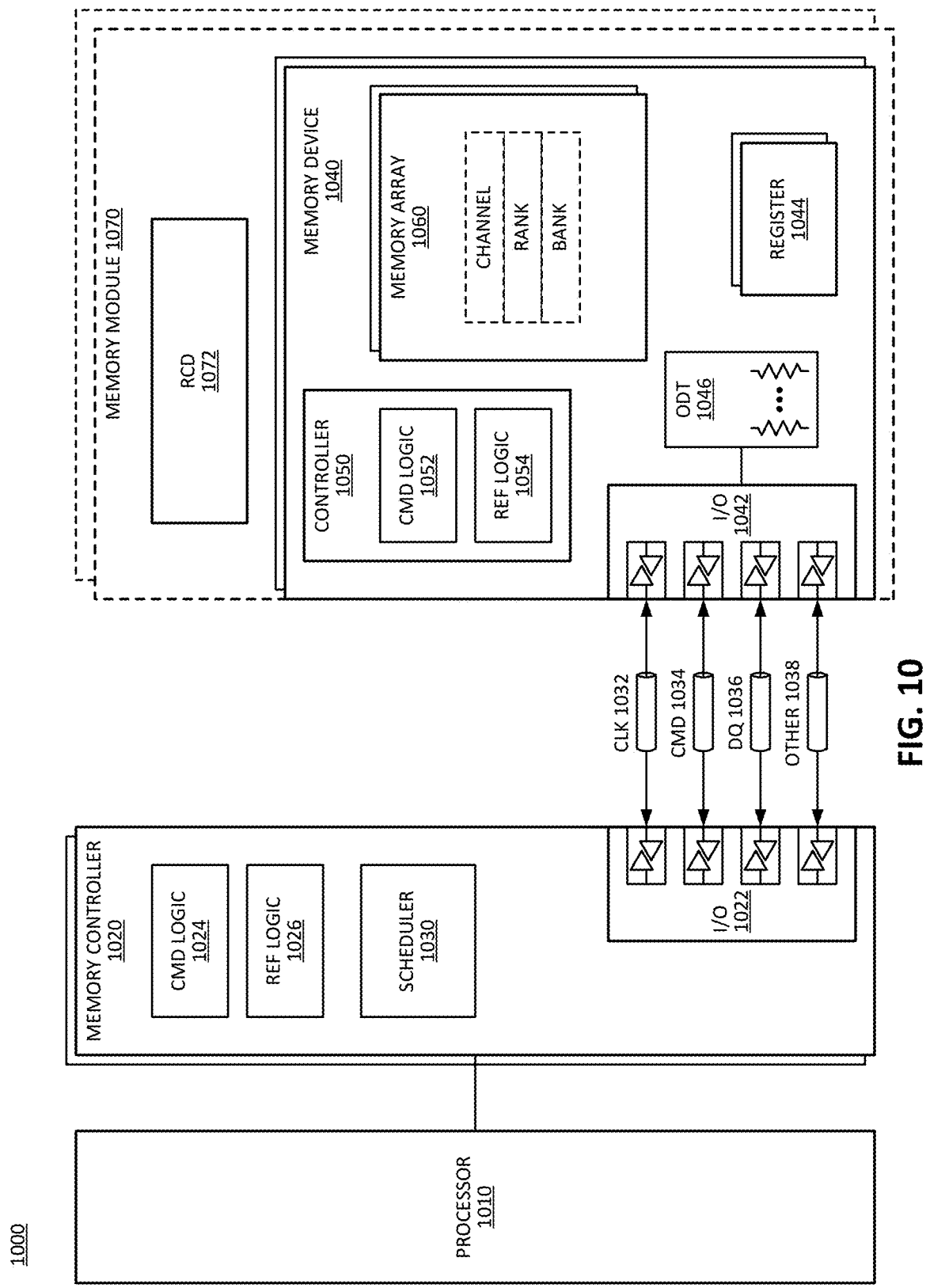
FIG. 10 is a block diagram of an example of a memory subsystem in which an in-band configuration mode can be implemented.

FIG. 10 is a block diagram of an example of a memory subsystem in which an in-band configuration mode can be implemented. System 1000 includes a processor and elements of a memory subsystem in a computing device. System 1000 represents a system with a memory subsystem in accordance with an example of system 102 or an example of system 200 or an example of system 300.

In one example, system 1000 includes RCD 1072 in memory module 1070. RCD 1072 can have its configuration programmed with in-band register writes in accordance with any description herein. Memory device 1040 can represent a DRAM device, which can have its configuration programmed with in-band register writes in accordance with any description herein.

Processor 1010 represents a processing unit of a computing platform that may execute an operating system (OS) and applications, which can collectively be referred to as the host or the user of the memory. The OS and applications execute operations that result in memory accesses. Processor 1010 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 1000 can be implemented as an SOC (system on a chip), or be implemented with standalone components.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random-access memory), or some variant such as synchronous DRAM (SDRAM). A memory subsystem as described herein may be compatible with a number of memory technologies, such as DDR4 (double data rate version 4, JESD79-4, originally published in September 2012 by JEDEC (Joint Electron Device Engineering Council, now the JEDEC Solid State Technology Association), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, originally published by JEDEC in July 2020), LPDDR5 (LPDDR version 5, JESD209-5, originally published by JEDEC in February 2019), HBM2 (HBM version 2, JESD235C, originally published by JEDEC in January 2020), HBM3 (HBM version 3, JESD238, originally published by JEDEC in January 2022), DDR6 (DDR version 6, in discussion), GDDR7 (graphics DDR version 7, in discussion), or others or combinations of memory technologies, and technologies based on derivatives or extensions of such specifications.

Memory controller 1020 represents one or more memory controller circuits or devices for system 1000. In one example, memory controller 1020 is on the same semiconductor substrate as processor 1010. Memory controller 1020 represents control logic that generates memory access commands in response to the execution of operations by processor 1010. Memory controller 1020 accesses one or more memory devices 1040. Memory devices 1040 can be DRAM devices in accordance with any referred to above. In one example, memory devices 1040 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 1020 manages a separate memory channel, although system 1000 can be configured to have multiple channels managed by a single controller, or to have multiple controllers on a single channel. In one example, memory controller 1020 is part of host processor 1010, such as logic implemented on the same die or implemented in the same package space as the processor.

Memory controller 1020 includes I/O interface logic 1022 to couple to a memory bus, such as a memory channel as referred to above. I/O interface logic 1022 (as well as I/O interface logic 1042 of memory device 1040) can include pins, pads, connectors, signal lines, traces, or wires, or other hardware to connect the devices, or a combination of these. I/O interface logic 1022 can include a hardware interface. As illustrated, I/O interface logic 1022 includes at least drivers/transceivers for signal lines. Commonly, wires within an integrated circuit interface couple with a pad, pin, or connector to interface signal lines or traces or other wires between devices. I/O interface logic 1022 can include drivers, receivers, transceivers, or termination, or other circuitry or combinations of circuitry to exchange signals on the signal lines between the devices. The exchange of signals includes at least one of transmit or receive. While shown as coupling I/O 1022 from memory controller 1020 to I/O 1042 of memory device 1040, it will be understood that in an implementation of system 1000 where groups of memory devices 1040 are accessed in parallel, multiple memory devices can include I/O interfaces to the same interface of memory controller 1020. In an implementation of system 1000 including one or more memory modules 1070, I/O 1042 can include interface hardware of the memory module in addition to interface hardware on the memory device itself. Other memory controllers 1020 will include separate interfaces to other memory devices 1040.

The bus between memory controller 1020 and memory devices 1040 can be implemented as multiple signal lines coupling memory controller 1020 to memory devices 1040. The bus may typically include at least clock (CLK) 1032, command/address (CMD) 1034, data (DQ) 1036, and zero or more other signal lines 1038. In one example, a bus or connection between memory controller 1020 and memory can be referred to as a memory bus. In one example, the memory bus is a multi-drop bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 1000 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 1020 and memory devices 1040. An example of a serial bus technology is 8B10B encoding and transmission of high-speed data with embedded clock over a single differential pair of signals in each direction. In one example, CMD 1034 represents signal lines shared in parallel with multiple memory devices. In one example, multiple memory devices share encoding command signal lines of CMD 1034, and each has a separate chip select (CS_n) signal line to select individual memory devices.

It will be understood that in the example of system 1000, the bus between memory controller 1020 and memory devices 1040 includes a subsidiary command bus CMD 1034 and a subsidiary bus to carry the write and read data, DQ 1036. In one example, the data bus can include bidirectional lines for read data and for write/command data. In another example, the subsidiary bus DQ 1036 can include unidirectional write signal lines for write and data from the host to memory, and can include unidirectional lines for read data from the memory to the host. In accordance with the chosen memory technology and system design, other signals 1038 may accompany a bus or sub bus, such as strobe lines DQS. Based on design of system 1000, or implementation if a design supports multiple implementations, the data bus can have more or less bandwidth per memory device 1040. For example, the data bus can support memory devices that have either a x4 interface, a x8 interface, a x16 interface, or other interface. The convention "xW," where W is an integer that refers to an interface size or width of the interface of memory device 1040, which represents a number of signal lines to exchange data with memory controller 1020. The interface size of the memory devices is a controlling factor on how many memory devices can be used concurrently per channel in system 1000 or coupled in parallel to the same signal lines. In one example, high bandwidth memory devices, wide interface devices, or stacked memory configurations, or combinations, can enable wider interfaces, such as a x128 interface, a x256 interface, a x512 interface, a x1024 interface, or other data bus interface width.

In one example, memory devices 1040 and memory controller 1020 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length eight (BL8), and each memory device 1040 can transfer data on each UI. Thus, a x8 memory device operating on BL8 can transfer 64 bits of data (8 data signal lines times 8 data bits transferred per line over the burst). It will be understood that this simple example is merely an illustration and is not limiting.

Memory devices 1040 represent memory resources for system 1000. In one example, each memory device 1040 is a separate memory die. In one example, each memory device 1040 can interface with multiple (e.g., 2) channels per device or die. Each memory device 1040 includes I/O interface logic 1042, which has a bandwidth determined by the implementation of the device (e.g., x16 or x8 or some other interface bandwidth). I/O interface logic 1042 enables the memory devices to interface with memory controller 1020. I/O interface logic 1042 can include a hardware interface, and can be in accordance with I/O 1022 of memory controller, but at the memory device end. In one example, multiple memory devices 1040 are connected in parallel to the same command and data buses. In another example, multiple memory devices 1040 are connected in parallel to the same command bus, and are connected to different data buses. For example, system 1000 can be configured with multiple memory devices 1040 coupled in parallel, with each memory device responding to a command, and accessing memory resources 1060 internal to each. For a Write operation, an individual memory device 1040 can write a portion of the overall data word, and for a Read operation, an individual memory device 1040 can fetch a portion of the overall data word. The remaining bits of the word will be provided or received by other memory devices in parallel.

In one example, memory devices 1040 are disposed directly on a motherboard or host system platform (e.g., a PCB (printed circuit board) or substrate on which processor 1010 is disposed) of a computing device. In one example, memory devices 1040 can be organized into memory modules 1070. In one example, memory modules 1070 represent dual inline memory modules (DIMMs). In one example, memory modules 1070 represent other organization of multiple memory devices to share at least a portion of access or control circuitry, which can be a separate circuit, a separate device, or a separate board from the host system platform. Memory modules 1070 can include multiple memory devices 1040, and the memory modules can include support for multiple separate channels to the included memory devices disposed on them. In another example, memory devices 1040 may be incorporated into the same package as memory controller 1020, such as by techniques such as multi-chip-module (MCM), package-on-package, through-silicon via (TSV), or other techniques or combinations. Similarly, in one example, multiple memory devices 1040 may be incorporated into memory modules 1070, which themselves may be incorporated into the same package as memory controller 1020. It will be appreciated that for these and other implementations, memory controller 1020 may be part of host processor 1010.

Memory devices 1040 each include one or more memory arrays 1060. Memory array 1060 represents addressable memory locations or storage locations for data. Typically, memory array 1060 is managed as rows of data, accessed via wordline (rows) and bitline (individual bits within a row) control. Memory array 1060 can be organized as separate channels, ranks, and banks of memory. Channels may refer to independent control paths to storage locations within memory devices 1040. Ranks may refer to common locations across multiple memory devices (e.g., same row addresses within different devices) in parallel. Banks may refer to sub-arrays of memory locations within a memory device 1040. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 1040 include one or more registers 1044. Register 1044 represents one or more storage devices or storage locations that provide configuration or settings for the operation of the memory device. In one example, register 1044 can provide a storage location for memory device 1040 to store data for access by memory controller 1020 as part of a control or management operation. In one example, register 1044 includes one or more Mode Registers. In one example, register 1044 includes one or more multipurpose registers. The configuration of locations within register 1044 can configure memory device 1040 to operate in different "modes," where command information can trigger different operations within memory device 1040 based on the mode. Additionally or in the alternative, different modes can also trigger different operation from address information or other signal lines depending on the mode. Settings of register 1044 can indicate configuration for I/O settings (e.g., timing, termination or ODT (on-die termination) 1046, driver configuration, or other I/O settings).

In one example, memory device 1040 includes ODT 1046 as part of the interface hardware associated with I/O 1042. ODT 1046 can be configured as mentioned above, and provide settings for impedance to be applied to the interface to specified signal lines. In one example, ODT 1046 is applied to DQ signal lines. In one example, ODT 1046 is applied to command signal lines. In one example, ODT 1046 is applied to address signal lines. In one example, ODT 1046 can be applied to any combination of the preceding. The ODT settings can be changed based on whether a memory device is a selected target of an access operation or a non-target device. ODT 1046 settings can affect the timing and reflections of signaling on the terminated lines. Careful control over ODT 1046 can enable higher-speed operation with improved matching of applied impedance and loading. ODT 1046 can be applied to specific signal lines of I/O interface 1042, 1022 (for example, ODT for DQ lines or ODT for CA lines), and is not necessarily applied to all signal lines.

Memory device 1040 includes controller 1050, which represents control logic within the memory device to control internal operations within the memory device. For example, controller 1050 decodes commands sent by memory controller 1020 and generates internal operations to execute or satisfy the commands. Controller 1050 can be referred to as an internal controller, and is separate from memory controller 1020 of the host. Controller 1050 can determine what mode is selected based on register 1044, and configure the internal execution of operations for access to memory resources 1060 or other operations based on the selected mode. Controller 1050 generates control signals to control the routing of bits within memory device 1040 to provide a proper interface for the selected mode and direct a command to the proper memory locations or addresses. Controller 1050 includes command logic 1052, which can decode command encoding received on command and address signal lines. Thus, command logic 1052 can be or include a command decoder. With command logic 1052, memory device can identify commands and generate internal operations to execute requested commands.

Referring again to memory controller 1020, memory controller 1020 includes command (CMD) logic 1024, which represents logic or circuitry to generate commands to send to memory devices 1040. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 1040, memory controller 1020 can issue commands via I/O 1022 to cause memory device 1040 to execute the commands. In one example, controller 1050 of memory device 1040 receives and decodes command and address information received via I/O 1042 from memory controller 1020. Based on the received command and address information, controller 1050 can control the timing of operations of the logic and circuitry within memory device 1040 to execute the commands. Controller 1050 is responsible for compliance with standards or specifications within memory device 1040, such as timing and signaling requirements. Memory controller 1020 can implement compliance with standards or specifications by access scheduling and control.

Memory controller 1020 includes scheduler 1030, which represents logic or circuitry to generate and order transactions to send to memory device 1040. From one perspective, the primary function of memory controller 1020 could be said to schedule memory access and other transactions to memory device 1040. Such scheduling can include generating the transactions themselves to implement the requests for data by processor 1010 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 1020 typically includes logic such as scheduler 1030 to allow selection and ordering of transactions to improve performance of system 1000. Thus, memory controller 1020 can select which of the outstanding transactions should be sent to memory device 1040 in which order, which is typically achieved with logic much more complex that a simple first-in first-out algorithm. Memory controller 1020 manages the transmission of the transactions to memory device 1040, and manages the timing associated with the transaction. In one example, transactions have deterministic timing, which can be managed by memory controller 1020 and used in determining how to schedule the transactions with scheduler 1030.

In one example, memory controller 1020 includes refresh (REF) logic 1026. Refresh logic 1026 can be used for memory resources that are volatile and need to be refreshed to retain a deterministic state. In one example, refresh logic 1026 indicates a location for refresh, and a type of refresh to perform. Refresh logic 1026 can trigger self-refresh within memory device 1040, or execute external refreshes which can be referred to as auto refresh commands) by sending refresh commands, or a combination. In one example, controller 1050 within memory device 1040 includes refresh logic 1054 to apply refresh within memory device 1040. In one example, refresh logic 1054 generates internal operations to perform refresh in accordance with an external refresh received from memory controller 1020. Refresh logic 1054 can determine if a refresh is directed to memory device 1040, and what memory resources 1060 to refresh in response to the command.

Figure 11A:
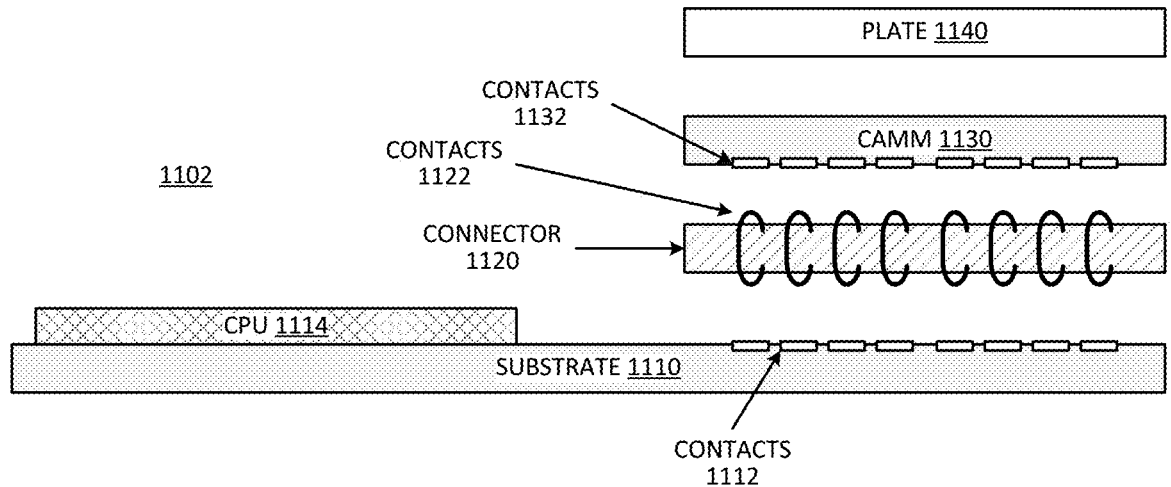
FIGS. 11A-11B are block diagrams of an example of a CAMM system in which alert signal testing can be implemented.
Figure 11B:
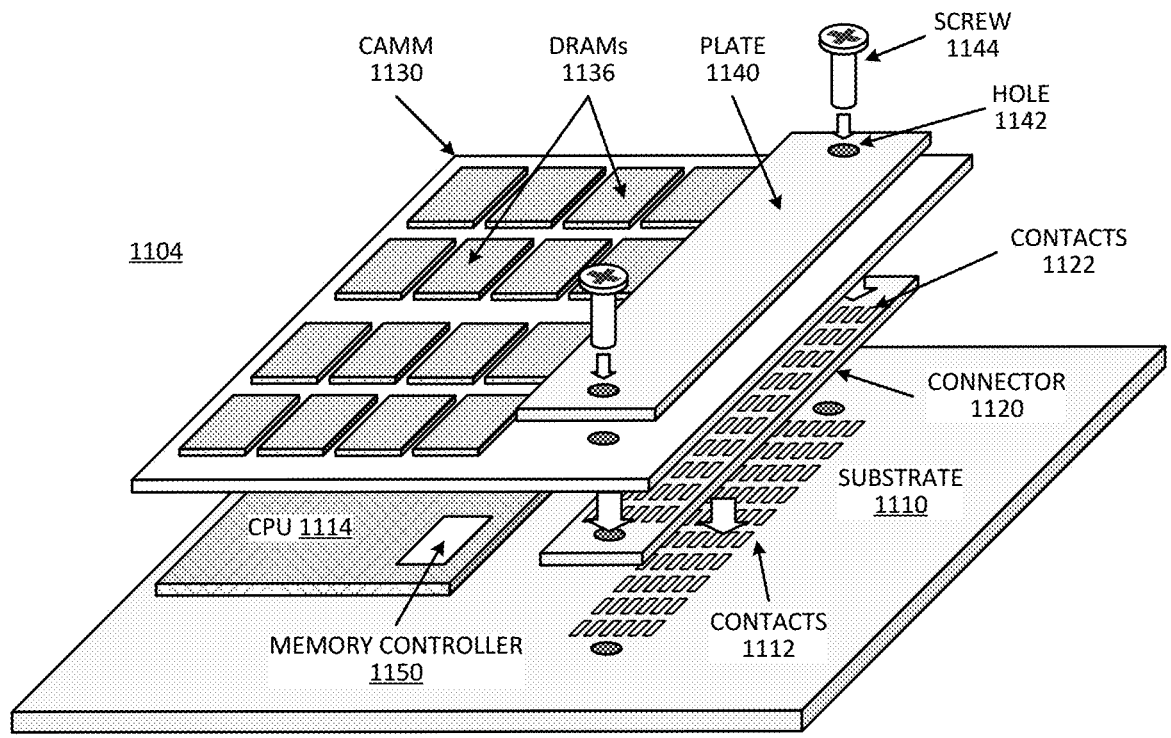

FIGS. 11A-11B are block diagrams of an example of a CAMM system in which alert signal testing can be implemented.

Referring to FIG. 11A, system 1102 includes a memory stack architecture monitored by a memory fault tracker that can perform mirroring. System 1102 is an example of a system in accordance with an example of system 102, system 200, or system 300.

Substrate 1110 illustrates an SOC package substrate or a motherboard or system board. Substrate 1110 includes contacts 1112, which represent contacts for connecting with memory. CPU 1114 represents a processor or central processing unit (CPU) chip or graphics processing unit (GPU) chip to be disposed on substrate 1110. CPU 1114 performs the computational operations in system 1102. In one example, CPU 1114 includes multiple cores (not specifically shown), which can generate operations that request data to be read from and written to memory. CPU 1114 can include a memory controller to manage access to the memory devices.

Compression-attached memory module (CAMM) 1130 represents a module with memory devices, which are not specifically illustrated in system 1102. Substrate 1110 couples to CAMM 1130 and its memory devices through compression mount technology (CMT) connector 1120. Connector 1120 includes contacts 1122, which are compression-based contacts. The compression-based contacts are compressible pins or devices whose shape compresses with the application of pressure on connector 1120. In one example, contacts 1122 represent C-shaped pins as illustrated. In one example, contacts 1122 represent another compressible pin shape, such as a spring-shape, an S-shape, or pins having other shapes that can be compressed.

CAMM 1130 includes contacts 1132 on a side of the CAMM board that interfaces with connector 1120. Contacts 1132 connect to memory devices on the CAMM board. Plate 1140 represents a plate or housing that provides structure to apply pressure to compress contacts 1122 of connector 1120.

Referring to FIG. 11B, system 1104 is a perspective view of a system in accordance with system 1102. System 1104 illustrates memory controller 1150, which is not specifically illustrated in system 1102. Memory controller 1150 can provide row hammer mitigation to DRAMs 1136. DRAMs 1136 can be connected to memory controller 1150 with an alert signal line. System 1104 enables DRAMs 1136 to perform an alert signal test mode with memory controller 1150 in accordance with any example herein.

CAMM 1130 is illustrated with memory chips or memory dies, identified as DRAMs 1136 on one or both faces of the PCB of CAMM 1130. DRAMs 1136 are coupled with conductive contacts via conductive traces in or on the PCB, which couples with contacts 1132, which in turn couple with contacts 1122 of connector 1120.

System 1104 illustrates holes 1142 in plate 1140 to receive fasteners, represented by screws 1144. There are corresponding holes through CAMM 1130, connector 1120, and in substrate 1110. Screws 1144 can compressibly attach the CAMM 1130 to substrate 1110 via connector 1120.

Figure 12:
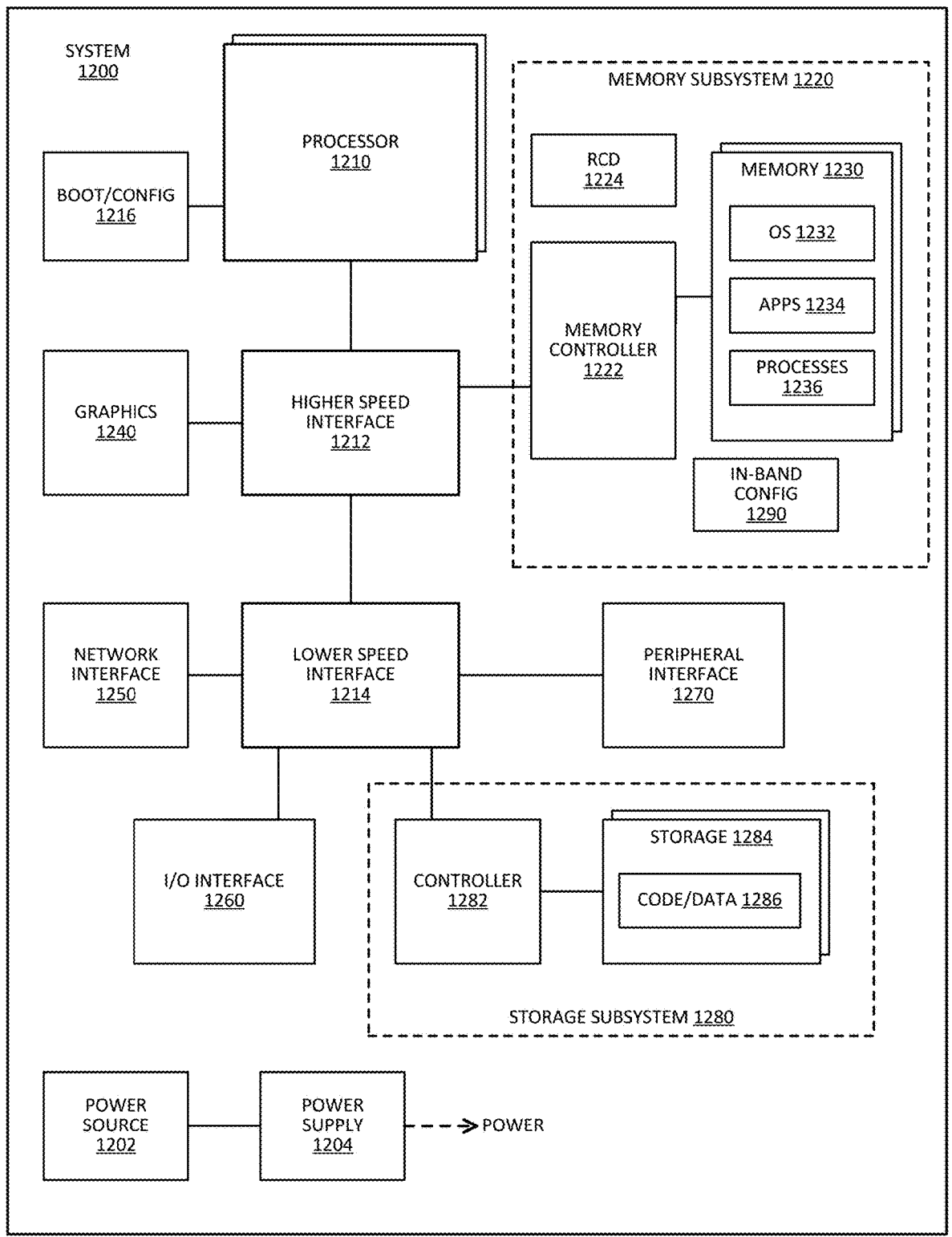
FIG. 12 is a block diagram of an example of a computing system in which in-band configuration mode can be implemented.

FIG. 12 is a block diagram of an example of a computing system in which in-band configuration mode can be implemented. System 1200 represents a computing device in accordance with any example herein, and can be a laptop computer, a desktop computer, a tablet computer, a server, a gaming or entertainment control system, embedded computing device, or other electronic device. System 1200 represents a system with storage in accordance with an example of system 102 or an example of system 200 or an example of system 300.

In one example, system 1200 includes memory subsystem 1220, with RCD 1224 in a memory module. RCD 1224 can have its configuration programmed with in-band register writes in accordance with any description herein. Memory 1230 can represent a DRAM device, which can have its configuration programmed with in-band register writes in accordance with any description herein. In-band configuration (CONFIG) 1290 represents the components that enable system to perform in-band register configuration updates with an update mode.

System 1200 includes processor 1210 can include any type of microprocessor, central processing unit (CPU), graphics processing unit (GPU), processing core, or other processing hardware, or a combination, to provide processing or execution of instructions for system 1200. Processor 1210 can be a host processor device. Processor 1210 controls the overall operation of system 1200, and can be or include, one or more programmable general-purpose or special-purpose microprocessors, digital signal processors (DSPs), programmable controllers, application specific integrated circuits (ASICs), programmable logic devices (PLDs), or a combination of such devices.

System 1200 includes boot/config 1216, which represents storage to store boot code (e.g., basic input/output system (BIOS)), configuration settings, security hardware (e.g., trusted platform module (TPM)), or other system level hardware that operates outside of a host OS. Boot/config 1216 can include a nonvolatile storage device, such as read-only memory (ROM), flash memory, or other memory devices.

In one example, system 1200 includes interface 1212 coupled to processor 1210, which can represent a higher speed interface or a high throughput interface for system components that need higher bandwidth connections, such as memory subsystem 1220 or graphics interface components 1240. Interface 1212 represents an interface circuit, which can be a standalone component or integrated onto a processor die. Interface 1212 can be integrated as a circuit onto the processor die or integrated as a component on a system on a chip. Where present, graphics interface 1240 interfaces to graphics components for providing a visual display to a user of system 1200. Graphics interface 1240 can be a standalone component or integrated onto the processor die or system on a chip. In one example, graphics interface 1240 can drive a high definition (HD) display or ultra high definition (UHD) display that provides an output to a user. In one example, the display can include a touchscreen display. In one example, graphics interface 1240 generates a display based on data stored in memory 1230 or based on operations executed by processor 1210 or both.

Memory subsystem 1220 represents the main memory of system 1200, and provides storage for code to be executed by processor 1210, or data values to be used in executing a routine. Memory subsystem 1220 can include one or more varieties of random-access memory (RAM) such as DRAM, 3DXP (three-dimensional crosspoint), or other memory devices, or a combination of such devices. Memory 1230 stores and hosts, among other things, operating system (OS) 1232 to provide a software platform for execution of instructions in system 1200. Additionally, applications 1234 can execute on the software platform of OS 1232 from memory 1230. Applications 1234 represent programs that have their own operational logic to perform execution of one or more functions. Processes 1236 represent agents or routines that provide auxiliary functions to OS 1232 or one or more applications 1234 or a combination. OS 1232, applications 1234, and processes 1236 provide software logic to provide functions for system 1200. In one example, memory subsystem 1220 includes memory controller 1222, which is a memory controller to generate and issue commands to memory 1230. It will be understood that memory controller 1222 could be a physical part of processor 1210 or a physical part of interface 1212. For example, memory controller 1222 can be an integrated memory controller, integrated onto a circuit with processor 1210, such as integrated onto the processor die or a system on a chip.

While not specifically illustrated, it will be understood that system 1200 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 1200 includes interface 1214, which can be coupled to interface 1212. Interface 1214 can be a lower speed interface than interface 1212. In one example, interface 1214 represents an interface circuit, which can include standalone components and integrated circuitry. In one example, multiple user interface components or peripheral components, or both, couple to interface 1214. Network interface 1250 provides system 1200 the ability to communicate with remote devices (e.g., servers or other computing devices) over one or more networks. Network interface 1250 can represent a network interface circuit (NIC) that enables connection with a remote device over a network connection. The network connection enabled by network interface 1250 can include an Ethernet adapter, wireless interconnection components, cellular network interconnection components, USB (universal serial bus), or other wired or wireless standards-based or proprietary interfaces. Network interface 1250 can exchange data with a remote device, which can include sending data stored in memory or receiving data to be stored in memory.

In one example, system 1200 includes one or more input/output (I/O) interface(s) 1260. I/O interface 1260 can include one or more interface components through which a user interacts with system 1200 (e.g., audio, alphanumeric, tactile/touch, or other interfacing). Peripheral interface 1270 can include any hardware interface not specifically mentioned above. Peripherals refer generally to devices that connect dependently to system 1200. A dependent connection is one where system 1200 provides the software platform or hardware platform or both on which operation executes, and with which a user interacts.

In one example, system 1200 includes storage subsystem 1280 to store data in a nonvolatile manner. In one example, in certain system implementations, at least certain components of storage 1280 can overlap with components of memory subsystem 1220. Storage subsystem 1280 includes storage device(s) 1284, which can be or include any conventional medium for storing large amounts of data in a nonvolatile manner, such as one or more magnetic, solid state, NAND, 3DXP, or optical based disks, or a combination. Storage 1284 holds code or instructions and data 1286 in a persistent state (i.e., the value is retained despite interruption of power to system 1200). Storage 1284 can be generically considered to be a "memory," although memory 1230 is typically the executing or operating memory to provide instructions to processor 1210. Whereas storage 1284 is nonvolatile, memory 1230 can include volatile memory (i.e., the value or state of the data is indeterminate if power is interrupted to system 1200). In one example, storage subsystem 1280 includes controller 1282 to interface with storage 1284. In one example controller 1282 is a physical part of interface 1214 or processor 1210, or can include circuits or logic in both processor 1210 and interface 1214.

Power source 1202 provides power to the components of system 1200. More specifically, power source 1202 typically interfaces to one or multiple power supplies 1204 in system 1200 to provide power to the components of system 1200. In one example, power supply 1204 includes an AC to DC (alternating current to direct current) adapter to plug into a wall outlet. Such AC power can be renewable energy (e.g., solar power) power source 1202. In one example, power source 1202 includes a DC power source, such as an external AC to DC converter. In one example, power source 1202 or power supply 1204 includes wireless charging hardware to charge via proximity to a charging field. In one example, power source 1202 can include an internal battery or fuel cell source.

Figure 13:
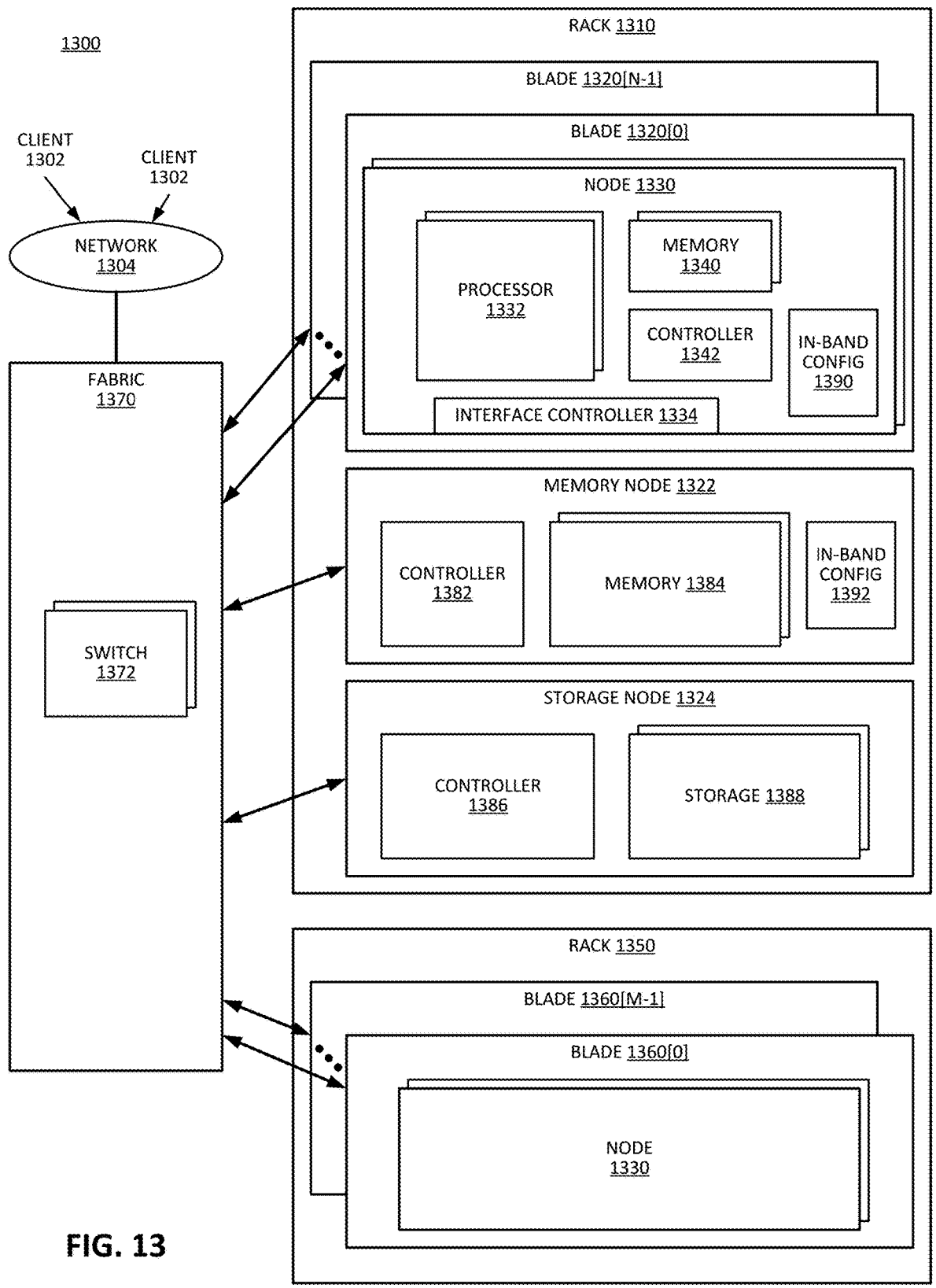
FIG. 13 is a block diagram of an example of a multi-node network in which in-band configuration mode can be implemented.

FIG. 13 is a block diagram of an example of a multi-node network in which in-band configuration mode can be implemented. System 1300 represents a network of nodes that can apply adaptive ECC. In one example, system 1300 represents a data center. In one example, system 1300 represents a server farm. In one example, system 1300 represents a data cloud or a processing cloud.

System 1300 represents a system with storage in accordance with an example of system 102 or an example of system 200 or an example of system 300. In one example, memory node 1322 includes memory modules with an RCD (not specifically illustrated). The RCD can have its configuration programmed with in-band register writes in accordance with any description herein, as represented by in-band configuration (CONFIG) 1392. System 1300 can include memory devices in accordance with what is described, and in-band configuration (CONFIG) 1390 represents the ability to use in-band register writes in accordance with any description herein to program an RCD and/or a memory device.

One or more clients 1302 make requests over network 1304 to system 1300. Network 1304 represents one or more local networks, or wide area networks, or a combination. Clients 1302 can be human or machine clients, which generate requests for the execution of operations by system 1300. System 1300 executes applications or data computation tasks requested by clients 1302.

In one example, system 1300 includes one or more racks, which represent structural and interconnect resources to house and interconnect multiple computation nodes. In one example, rack 1310 includes multiple nodes 1330. In one example, rack 1310 hosts multiple blade components, blade 1320[0], . . . , blade 1320[N−1], collectively blades 1320. Hosting refers to providing power, structural or mechanical support, and interconnection. Blades 1320 can refer to computing resources on printed circuit boards (PCBs), where a PCB houses the hardware components for one or more nodes 1330. In one example, blades 1320 do not include a chassis or housing or other "box" other than that provided by rack 1310. In one example, blades 1320 include housing with exposed connector to connect into rack 1310. In one example, system 1300 does not include rack 1310, and each blade 1320 includes a chassis or housing that can stack or otherwise reside in close proximity to other blades and allow interconnection of nodes 1330.

System 1300 includes fabric 1370, which represents one or more interconnectors for nodes 1330. In one example, fabric 1370 includes multiple switches 1372 or routers or other hardware to route signals among nodes 1330. Additionally, fabric 1370 can couple system 1300 to network 1304 for access by clients 1302. In addition to routing equipment, fabric 1370 can be considered to include the cables or ports or other hardware equipment to couple nodes 1330 together. In one example, fabric 1370 has one or more associated protocols to manage the routing of signals through system 1300. In one example, the protocol or protocols is at least partly dependent on the hardware equipment used in system 1300.

As illustrated, rack 1310 includes N blades 1320. In one example, in addition to rack 1310, system 1300 includes rack 1350. As illustrated, rack 1350 includes M blade components, blade 1360[0], . . . , blade 1360[M−1], collectively blades 1360. M is not necessarily the same as N; thus, it will be understood that various different hardware equipment components could be used, and coupled together into system 1300 over fabric 1370. Blades 1360 can be the same or similar to blades 1320. Nodes 1330 can be any type of node and are not necessarily all the same type of node. System 1300 is not limited to being homogenous, nor is it limited to not being homogenous.

The nodes in system 1300 can include compute nodes, memory nodes, storage nodes, accelerator nodes, or other nodes. Rack 1310 is represented with memory node 1322 and storage node 1324, which represent shared system memory resources, and shared persistent storage, respectively. One or more nodes of rack 1350 can be a memory node or a storage node.

Nodes 1330 represent examples of compute nodes. For simplicity, only the compute node in blade 1320[0] is illustrated in detail. However, other nodes in system 1300 can be the same or similar. At least some nodes 1330 are computation nodes, with processor (proc) 1332 and memory 1340. A computation node refers to a node with processing resources (e.g., one or more processors) that executes an operating system and can receive and process one or more tasks. In one example, at least some nodes 1330 are server nodes with a server as processing resources represented by processor 1332 and memory 1340.

Memory node 1322 represents an example of a memory node, with system memory external to the compute nodes. Memory nodes can include controller 1382, which represents a processor on the node to manage access to the memory. The memory nodes include memory 1384 as memory resources to be shared among multiple compute nodes.

Storage node 1324 represents an example of a storage server, which refers to a node with more storage resources than a computation node, and rather than having processors for the execution of tasks, a storage server includes processing resources to manage access to the storage nodes within the storage server. Storage nodes can include controller 1386 to manage access to the storage 1388 of the storage node.

In one example, node 1330 includes interface controller 1334, which represents logic to control access by node 1330 to fabric 1370. The logic can include hardware resources to interconnect to the physical interconnection hardware. The logic can include software or firmware logic to manage the interconnection. In one example, interface controller 1334 is or includes a host fabric interface, which can be a fabric interface in accordance with any example described herein. The interface controllers for memory node 1322 and storage node 1324 are not explicitly shown.

Processor 1332 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 1340 can be or include memory devices represented by memory 1340 and a memory controller represented by controller 1342.

In general with respect to the descriptions herein, in one aspect an apparatus includes: a hardware interface to interface with a command bus, the hardware interface to receive a mode register update (MRUPD) mode command to trigger entry into MRUPD mode; a decision feedback equalization (DFE) configuration register to store a first configuration setting for the hardware interface to the command bus; and a second configuration register for a configuration setting other than DFE, the second configuration register to store a second configuration setting for the hardware interface to the command bus; wherein the apparatus is to update the second configuration register with mode register write (MRW) commands in the MRUPD mode.

In one example of the apparatus, the hardware interface comprises a hardware interface of a dynamic random access memory (DRAM) device, wherein the MRUPD mode is to In update configuration for the DRAM device. In accordance with any preceding example of the apparatus, in one example, the hardware interface comprises a hardware interface of a registering clock driver (RCD), wherein the MRUPD mode is to update configuration for the RCD. In accordance with any preceding example of the apparatus, in one example, the apparatus is to update the second configuration register to store a configuration setting for on-die termination (ODT) in the MRUPD mode. In accordance with any preceding example of the apparatus, in one example, the apparatus is to update the second configuration register to store a configuration setting for voltage reference (Vref) in the MRUPD mode. In accordance with any preceding example of the apparatus, in one example, the second configuration register comprises multiple additional configuration registers for multiple additional configuration settings, where the apparatus is to update the multiple additional configuration registers in sequence in the MRUPD mode to store the multiple additional configuration settings, and then to exit the MRUPD mode. In accordance with any preceding example of the apparatus, in one example, the apparatus is to update configuration for chip select (CS) and for command and address (CA) in sequence. In accordance with any preceding example of the apparatus, in one example, the apparatus is to update the DFE configuration register in the MRUPD mode. In accordance with any preceding example of the apparatus, in one example, the apparatus is to update the second configuration register with mode register write (MRW) commands in the MRUPD mode.

In general with respect to the descriptions herein, in one aspect a computer system includes: a memory controller coupled to a command bus; and a memory chip coupled to the command bus with a command bus interface, the memory chip to receive a MRUPD mode command from the memory controller to trigger the memory chip to enter an MRUPD mode, the memory chip including: a decision feedback equalization (DFE) configuration register to store a first configuration setting for the command bus interface; and a second configuration register for a configuration setting other than DFE, the second configuration register to store a second configuration setting for the command bus interface; wherein the memory chip is to update the second configuration register with write commands in the MRUPD mode.

In one example of the computer system, in one example, the memory chip comprises a dynamic random access memory (DRAM) device, wherein the MRUPD mode is to update configuration for the DRAM device. In accordance with any preceding example of the computer system, in one example, the memory chip comprises a registering clock driver (RCD), wherein the MRUPD mode is to update configuration for the RCD. In accordance with any preceding example of the computer system, in one example, the memory chip is to update the second configuration register to store a configuration setting for on-die termination (ODT) in the MRUPD mode. In accordance with any preceding example of the computer system, in one example, the memory chip is to update the second configuration register to store a configuration setting for voltage reference (Vref) in the MRUPD mode. In accordance with any preceding example of the computer system, in one example, the second configuration register comprises multiple additional configuration registers for multiple additional configuration settings, where the memory chip is to update the multiple additional configuration registers in sequence in the MRUPD mode to store the multiple additional configuration settings, and then to exit the MRUPD mode. In accordance with any preceding example of the computer system, in one example, the memory chip is to update configuration for chip select (CS) and for command and address (CA) in sequence. In accordance with any preceding example of the computer system, in one example, the memory chip is to update the DFE configuration register in the MRUPD mode. In accordance with any preceding example of the computer system, in one example, the computer system includes a multicore processor device coupled to the memory controller. In accordance with any preceding example of the computer system, in one example, the computer system includes a display communicatively coupled to a processor device. In accordance with any preceding example of the computer system, in one example, the computer system includes a battery to power the system. In accordance with any preceding example of the computer system, in one example, the computer system includes a network interface circuit to couple with a remote device over a network connection.

In general with respect to the descriptions herein, in one aspect a method for setting a configuration includes: receiving a mode register update (MRUPD) mode command to trigger entry into MRUPD mode; updating a decision feedback equalization (DFE) configuration register in the MRUPD mode; and updating a second configuration register for a configuration setting other than DFE in the MRUPD mode.

In one example of the method, receiving the MRUPD mode command comprises receiving the MRUPD command at a dynamic random access memory (DRAM) device, wherein the MRUPD mode is to update configuration for the DRAM device, In accordance with any preceding example of the method, in one example, receiving the MRUPD mode command comprises receiving the MRUPD command at a registering clock driver (RCD), wherein the MRUPD mode is to update configuration for the RCD. In accordance with any preceding example of the method, in one example, updating the second configuration register comprises storing a configuration setting for on-die termination (ODT) in the MRUPD mode. In accordance with any preceding example of the method, in one example, storing a configuration setting for voltage reference (Vref) in the MRUPD mode. In accordance with any preceding example of the method, in one example, the second configuration register comprises multiple additional configuration registers for multiple additional configuration settings, where updating the second configuration register comprises storing the multiple additional configuration settings in sequence in the MRUPD mode, and then exiting the MRUPD mode. In accordance with any preceding example of the method, in one example, updating the second configuration comprises updating configuration for chip select (CS) and for command and address (CA) in sequence. In accordance with any preceding example of the method, in one example, updating the second configuration comprises updating the DFE configuration register in the MRUPD mode. In accordance with any preceding example of the method, in one example, updating the second configuration comprises updating the second configuration register with mode register write (MRW) commands in the MRUPD mode.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:
  a hardware interface to interface with a command bus, the hardware interface to receive a mode register update (MRUPD) mode command to trigger entry into MRUPD mode;
  a decision feedback equalization (DFE) configuration register to store a first configuration setting for the hardware interface to the command bus; and
  a second configuration register for a configuration setting other than DFE, the second configuration register to store a second configuration setting for the hardware interface to the command bus;
  wherein the apparatus is to update the second configuration register with mode register write (MRW) commands in the MRUPD mode.

2. The apparatus of claim 1, wherein the hardware interface comprises a hardware interface of a dynamic random access memory (DRAM) device, wherein the MRUPD mode is to update configuration for the DRAM device.

3. The apparatus of claim 1, wherein the hardware interface comprises a hardware interface of a registering clock driver (RCD), wherein the MRUPD mode is to update configuration for the RCD.

4. The apparatus of claim 1, wherein the apparatus is to update the second configuration register to store a configuration setting for on-die termination (ODT) in the MRUPD mode.

5. The apparatus of claim 1, wherein the apparatus is to update the second configuration register to store a configuration setting for voltage reference (Vref) in the MRUPD mode.

6. The apparatus of claim 1, wherein the second configuration register comprises multiple additional configuration registers for multiple additional configuration settings, where the apparatus is to update the multiple additional configuration registers in sequence in the MRUPD mode to store the multiple additional configuration settings, and then to exit the MRUPD mode.

7. The apparatus of claim 6, wherein the apparatus is to update configuration for chip select (CS) and for command and address (CA) in sequence.

8. The apparatus of claim 1, wherein the apparatus is to update the DFE configuration register in the MRUPD mode.

9. The apparatus of claim 1, wherein the apparatus is to update the second configuration register with mode register write (MRW) commands in the MRUPD mode.

10. A computer system comprising:
a memory controller coupled to a command bus; and
a memory chip coupled to the command bus with a command bus interface, the memory chip to receive a MRUPD mode command from the memory controller to trigger the memory chip to enter an MRUPD mode, the memory chip including:
a decision feedback equalization (DFE) configuration register to store a first configuration setting for the command bus interface; and
a second configuration register for a configuration setting other than DFE, the second configuration register to store a second configuration setting for the command bus interface;
wherein the memory chip is to update the second configuration register with write commands in the MRUPD mode.

11. The computer system of claim 10, wherein the memory chip comprises a dynamic random access memory (DRAM) device, wherein the MRUPD mode is to update configuration for the DRAM device, or wherein the memory chip comprises a registering clock driver (RCD), wherein the MRUPD mode is to update configuration for the RCD.

12. The computer system of claim 10, wherein the memory chip is to update the second configuration register to store a configuration setting for on-die termination (ODT) in the MRUPD mode, or wherein the memory chip is to update the second configuration register to store a configuration setting for voltage reference (Vref) in the MRUPD mode.

13. The computer system of claim 10, wherein the second configuration register comprises multiple additional configuration registers for multiple additional configuration settings, where the memory chip is to update the multiple additional configuration registers in sequence in the MRUPD mode to store the multiple additional configuration settings, and then to exit the MRUPD mode.

14. The computer system of claim 13, wherein the memory chip is to update configuration for chip select (CS) and for command and address (CA) in sequence.

15. The computer system of claim 10, wherein the memory chip is to update the DFE configuration register in the MRUPD mode.

16. The computer system of claim 10, further comprising:
a multicore processor device coupled to the memory controller;
a display communicatively coupled to a processor device;
a battery to power the system; or
a network interface circuit to couple with a remote device over a network connection.

17. A method for setting a configuration, comprising:
receiving a mode register update (MRUPD) mode command to trigger entry into MRUPD mode;
updating a decision feedback equalization (DFE) configuration register in the MRUPD mode; and
updating a second configuration register for a configuration setting other than DFE in the MRUPD mode.

18. The method of claim 17, wherein receiving the MRUPD mode command comprises receiving the MRUPD command at a dynamic random access memory (DRAM) device, wherein the MRUPD mode is to update configuration for the DRAM device, or wherein receiving the MRUPD mode command comprises receiving the MRUPD command at a registering clock driver (RCD), wherein the MRUPD mode is to update configuration for the RCD.

19. The method of claim 17, wherein updating the second configuration register comprises storing a configuration setting for on-die termination (ODT) in the MRUPD mode or storing a configuration setting for voltage reference (Vref) in the MRUPD mode.

20. The method of claim 17, wherein the second configuration register comprises multiple additional configuration registers for multiple additional configuration settings, where updating the second configuration register comprises storing the multiple additional configuration settings in sequence in the MRUPD mode, and then exiting the MRUPD mode.

* * * * *